(12) United States Patent
Johnson et al.

(10) Patent No.: US 9,338,062 B2
(45) Date of Patent: May 10, 2016

(54) INFORMATION DISPLAYING METHOD AND APPARATUS

(71) Applicants: Wayne Noel Johnson, Asquith (AU); Richard Lloyd Jones, Kambah (AU)

(72) Inventors: Wayne Noel Johnson, Asquith (AU); Richard Lloyd Jones, Kambah (AU)

(73) Assignee: Encompass Corporation Pty Ltd, Sydney (AU)

( * ) Notice: Subject to any disclaimer, the term of this patent is extended or adjusted under 35 U.S.C. 154(b) by 318 days.

(21) Appl. No.: 13/849,672

(22) Filed: Mar. 25, 2013

(65) Prior Publication Data

US 2014/0289636 A1 Sep. 25, 2014

(51) Int. Cl.
| | |
|---|---|
| G06F 3/0481 | (2013.01) |
| H04L 12/24 | (2006.01) |
| G06F 17/30 | (2006.01) |
| G06F 3/0482 | (2013.01) |
| G06Q 30/02 | (2012.01) |

(52) U.S. Cl.
CPC .............. *H04L 41/22* (2013.01); *G06F 3/0481* (2013.01); *G06F 3/0482* (2013.01); *G06F 17/30961* (2013.01); *H04L 41/12* (2013.01); *G06F 17/30873* (2013.01); *G06F 17/30899* (2013.01); *G06Q 30/02* (2013.01)

(58) Field of Classification Search
CPC ..... H04L 41/22; H04L 41/12; H04L 12/2602; H04L 43/00; H04L 43/045; H04L 29/0809; H04L 29/08072; H04L 29/08009; G06F 17/30873; G06F 17/30899; G06F 3/0481; G06F 3/0482; G06F 9/4443; G06F 17/30961; G06F 17/30067; G06F 17/30575; G06F 17/30212; G06F 11/1446; G06F 11/1456; G06Q 30/02

See application file for complete search history.

(56) References Cited

U.S. PATENT DOCUMENTS

| | | | |
|---|---|---|---|
| 2007/0198600 A1* | 8/2007 | Betz .............................. 707/201 |
| 2007/0214179 A1* | 9/2007 | Hoang ........................ 707/104.1 |
| 2008/0208854 A1* | 8/2008 | Badr et al. ........................ 707/6 |
| 2008/0270458 A1* | 10/2008 | Gvelesiani ................ 707/103 R |
| 2009/0037848 A1* | 2/2009 | Tewari et al. ................... 715/835 |
| 2009/0164431 A1* | 6/2009 | Zivkovic et al. .................. 707/3 |
| 2010/0057713 A1* | 3/2010 | Gillam et al. ...................... 707/5 |
| 2010/0100561 A1* | 4/2010 | Cooper et al. ................ 707/769 |
| 2010/0175055 A1* | 7/2010 | Wang et al. ................... 717/137 |
| 2011/0055755 A1 | 3/2011 | Chen et al. |
| 2012/0023455 A1 | 1/2012 | Chen et al. |
| 2013/0246453 A1* | 9/2013 | Menten ......................... 707/769 |
| 2013/0268533 A1* | 10/2013 | Komarov ...................... 707/740 |

* cited by examiner

*Primary Examiner* — Tadeese Hailu
*Assistant Examiner* — Shangao Zhang
(74) *Attorney, Agent, or Firm* — Brown Rudnick LLP

(57) ABSTRACT

A method of displaying information relating to one or more entities, the method including, in an electronic processing device, generating a network representation, the representation including a number of nodes, each node being indicative of a corresponding entity, and a number of connections between nodes, the connections being indicative of relationships between the entities. The method further includes causing the network representation to be displayed to a user, in response to user input commands, determining at least one user selected node corresponding to a user selected entity, determining at least one search to be performed in respective of the corresponding entity associated with the at least one user selected node, performing the at least one search to thereby determine additional information regarding the entity and causing any additional information to be presented to the user.

16 Claims, 23 Drawing Sheets

INFORMATION DISPLAYING METHOD AND APPARATUS

BACKGROUND OF THE INVENTION

The present invention relates to a method and apparatus for displaying information, and in one particular example, to a method and apparatus for displaying information relating to one or more entities, to thereby provide business intelligence.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

There are very many electronic data collections containing information about entities, such as companies, individuals, or the like. Typically such sources of data are a mixture of publically available and restricted access data repositories and including information regarding land ownership, association with corporate entities, police records, or the like. However, having the information provided across multiple different repositories makes identifying and accessing relevant information difficult, meaning pertinent information is often overlooked when performing searches relating to entities.

Whilst a number of federated search mechanisms for searching across multiple data sources and aggregating results exist, such as those described in US20090006332, U.S. Pat. No. 8,321,444 and EP2176792A1, these are not typically user friendly and have limited abilities to data stored in different formats, making these difficult to use of unskilled individuals, and making them unsuitable for identifying business related information.

Whilst method and systems of determining and evaluating business networks for forming business relationships exist, such as those described in U.S. Pat. No. 8,249,903, US20080086343 and US20120316903, these deal with identifying paths through business networks and are not particularly useful for identifying information relating to specific entities across multiple disparate data sources.

A further difficulty in searching across multiple data sources is that information is often entered in different formats, and often includes inaccuracies, such as misspellings, as well as inconsistencies in the ways information such as names and addresses are used, making it difficult to identify the same entity across multiple data sources.

For example, when combining information about a person from different data sources, as occurs with federated searches, it is critical that the different records do indeed refer to the same person. The decision that two or more records are likely to be the same, depends on matching different aspects in each record, such as name, address, date of birth, place of birth. The most important component is the personal name as it is always the common element across different data holdings, which inevitably will hold different combinations of personal information.

As the major element of this identification process, matching names can be fraught with difficulty. Apart from lack of consistency in recording names (middle initial or name, different name orders etc.), in many instances there are small inconsistencies in spelling names, either introduced accidentally as typographic errors, or deliberately as a means of obscuring the real identity of a person.

A different but closely related problem to the merging of records after a federated search is the de-duplication of records in a data collection. This is a one-off or regular pre-planned event, which assumes access to the collection and uses the statistics in the collection as a whole identifies the likely candidates and either merges them, rejects them or requests user decisions. The matching of names is an integral part of this process. In name searching across one or more collection, there is no access to all the data in a collection, the answers that seem to refer to the same person need to be combined or linked and an answer is required in near real time.

Mechanisms for matching names are described for example in U.S. Pat. No. 1,435,663, US20090043584, U.S. Pat. No. 7,062,482. These techniques use the phonetic properties of letters to generate a code usually made up of a single letter followed by three digits, which is in turn used in name matching.

The standard existing method for matching misspelt words is the Levenshtein Distance Function, which is a string metric for measuring the difference between two sequences. Typically, the Levenshtein distance between two words is the minimum number of single-character edits required to change one word into the other. So, for example, for the names "Smid" and "Smidt", the Levenshtein distance is 1, whereas for "Szmidt" and "Szmyd", the Levenshtein distance is 2.

However, these techniques have not found widespread application, particularly in the field of business information matching across multiple data sources.

SUMMARY OF THE PRESENT INVENTION

In a first broad form the present invention seeks to provide a method of displaying information relating to one or more entities, the method including, in an electronic processing device:
- a) generating a network representation, the representation including:
  - i) a number of nodes, each node being indicative of a corresponding entity; and,
  - ii) a number of connections between nodes, the connections being indicative of relationships between the entities; and,
- b) causing the network representation to be displayed to a user;
- c) in response to user input commands, determining at least one user selected node corresponding to a user selected entity;
- d) determining at least one search to be performed in respective of the corresponding entity associated with the at least one user selected node;
- e) performing the at least one search to thereby determine additional information regarding the entity; and,
- f) causing any additional information to be presented to the user.

Typically the method includes generating a search query, the search query being applied to a database to thereby determine additional information regarding the entity.

Typically the additional information includes details of entities related to the at least one user selected entity, and wherein the method includes generating a second network representation, the second network representation including:

a) a number of nodes, each node being indicative of a corresponding entity and the entities include the at least one user selected entity and at least one related entity; and,
b) a number of connections between the nodes, the connections being indicative of relationships between the entities.

Typically the method includes generating the second network representation by modifying the network representation.

Typically the method includes modifying the network representation by adding one or more nodes corresponding to at least one related entity.

Typically the method includes, in response to user input commands:
a) displaying a list of a number of available searches relating to the at least one user selected entity; and,
b) determining selection of at least one of the available searches in accordance with user input commands.

Typically the method includes:
a) determining an entity type of the at least one user selected entity; and,
b) determining the search at least partially in accordance with the entity type.

Typically the method includes, displaying a list of available searches in accordance with the entity type.

Typically the method includes determining the at least one user selected node by determining selection of a node in the network representation using a user input device.

Typically the method includes generating a search query using at least one of:
a) predefined rules; and,
b) a predefined script.

Typically the method includes:
a) determining if further search parameters are required to generate the search query;
b) in response to a successful determination, causing required parameters to be displayed to a user; and,
c) determining the required parameters in response to user input commands.

Typically the method includes:
a) in response to user input commands, determining at least one manipulation of a network representation; and,
b) generating a manipulated network representation in accordance with user input commands.

Typically the method includes:
a) in response to user input commands, determining a search to be performed;
b) generating a search query in accordance with the determined search to be performed; the search query being applied to a repository to thereby determine details regarding:
 i) a number of entities; and,
 ii) relationships between the number of entities; and,
c) using the details to generate the network representation.

Typically the method includes:
a) determining search results data indicative of additional information; and,
b) analyzing the search results data to identify at least one entity.

Typically the method includes identifying at least one entity by at least one of:
a) pattern matching; and,
b) fuzzy logic.

Typically the method includes identifying at least one entity by at least one of:
a) determining entity details from the search results data, the entity details including at least one of:
 i) an entity name;
 ii) an entity address; and,
 iii) date of birth;
b) comparing the entity details to existing entity details for existing identified entities; and,
c) determining if the entity is one of the existing entities based on the results of the comparison.

Typically the method includes:
a) modifying the entity details in accordance with at least one of:
 i) defined misspellings; and,
 ii) phonetic equivalents; and,
b) comparing modified entity details to the existing entity details.

Typically the method includes:
a) determining a distance indicative of a difference between the entity details and existing entity details; and,
b) determining the entity as an existing entity based on the difference.

Typically the search results data is in the form of a mark-up data file and wherein the method includes:
a) determining a document definition; and,
b) determining entity details in the mark-up file using the document definition.

Typically the method includes receiving the search results data via a communications network.

In a second broad form the present invention seeks to provide apparatus for of displaying information relating to one or more entities, the apparatus including, in an electronic processing device for:
a) generating a network representation, the representation including:
 i) a number of nodes, each node being indicative of a corresponding entity; and,
 ii) a number of connections between nodes, the connections being indicative of relationships between the entities; and,
b) causing the network representation to be displayed to a user;
c) in response to user input commands, determining at least one user selected node;
d) determining at least one search to be performed in respective of the corresponding entity associated with the at least one user selected node;
e) performing the at least one search to thereby determine additional information regarding the entity; and,
f) causing any additional information to be presented to the user.

BRIEF DESCRIPTION OF THE DRAWINGS

An example of the present invention will now be described with reference to the accompanying drawings, in which:—

DETAILED DESCRIPTION OF THE PREFERRED EMBODIMENTS

Figure 1:
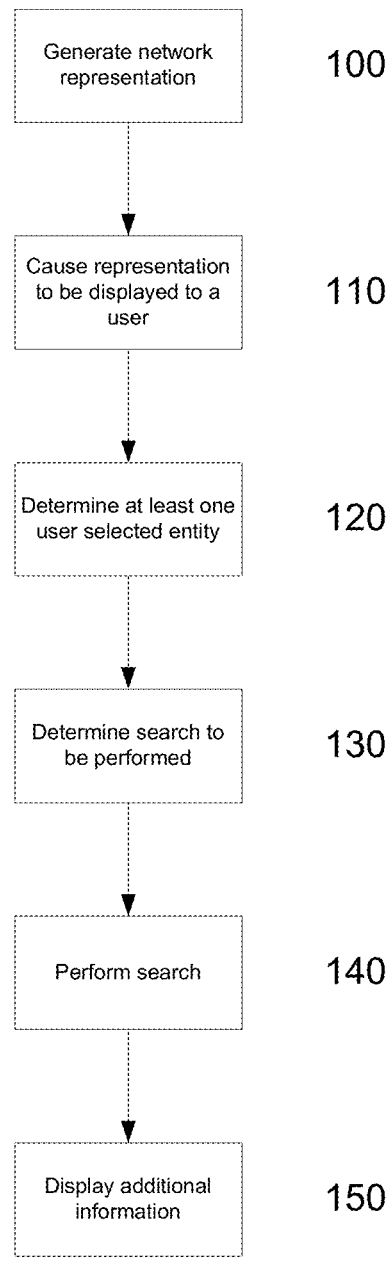
FIG. 1 is a flow chart of an example of a process for displaying information relating to one or more entities.

An example process for displaying information relating to one or more entities will now be described with reference to FIG. 1.

For the purpose of this example, it is assumed that the process is performed at least in part using an electronic processing device, such as a processor of a processing system, which in one example is in turn connected to one or more other computer systems, such as network servers, via a network architecture, as will be described in more detail below.

In this example, at step 100, the electronic processing device operates to generate a network representation. The network representation is used in order to display information relating to one or more entities and relationships therebetween. In this regard, the network representation typically includes a number of nodes, with each node being indicative of a corresponding entity, and a number of connections between nodes, with the connections being indicative of relationships between the entities.

The entities and relationships may be of any appropriate form, depending on the preferred implementation. In one example, the system is used to provide business intelligence information, in which case the entities are typically individuals, corporations, businesses, trusts, or any other party involved in a business or other commercial environment. Additionally, entities may also represent attributes of other entities, so for example, an address of a business could be presented as an entity that is related to the business. In general the relationship will represent some form of connection between the entities, such as ownership, involvement in transactions, or the like.

The network representation may be generated in any appropriate manner, but in one example this is achieved by having the electronic processing device ascertain information regarding entities and their relationships and then executing a predetermined procedure for generating the network representation. In this regard, the information can be determined in a number of ways depending on the preferred implementation, such as by examining internal data, or by querying one or more remote data sources, such as repositories of business information, including for example, company registers or the like.

At step 110, the electronic processing device causes the representation to be displayed to a user. This can be achieved in any one of a number of manners, such as displaying the representation via a local display, but in one example involves generating a webpage including the representation, which can then be viewed by a user utilising a browser application or the like executed by a computer system.

At step 120, in response to input commands provided by the user, at least one user-selected node is determined. The user-selected node corresponds to an entity of interest for the user and may be selected in any appropriate manner, such as by clicking on the network representation utilising a pointer device such as a mouse, or the like.

At step 130, the electronic processing device determines at least one search to be performed in respect of the corresponding entity associated with the user's selected node. The process of determining a search can be achieved using any suitable mechanism. In one example, the electronic processing device will determine a number of searches associated with an entity type of the selected entity, which are previously defined and stored in memory or the like. The electronic processing device can then provide details of these to the user allowing a user to select a particular search to be performed. However, alternatively this may be achieved using any other suitable technique such as selecting a predefined search or displaying required search parameters allowing these to be provided by the user.

At step 140, the electronic processing device performs the search. This may be achieved in any suitable manner and will depend on the search being performed, the location of stored data or the like. For example, the search may be performed of a data source located remotely to the electronic processing device, such as a remote database or other repository. In this example, the electronic processing device formats the search query and transfers this to the remote data source allowing the search to be performed. Alternatively, the electronic processing device can utilise the search to perform a search of data stored locally, for example in a database attached to the electronic processing device.

At step 150, any additional information regarding the user-selected entity, such as additional details regarding the entity and/or other entities related to the user-selected entity, can be displayed to the user. This may be achieved in any suitable manner and can simply include displaying the results of the search to a user via a graphical user interface or the like. Alternatively, however, this can involve generating a second network representation including the additional information. This can be achieved, for example, by updating the network representation with information regarding any additional entities and/or relationships. It will be appreciated that this provides an iterative process for allowing a user to perform further searching utilising the second network representation.

Accordingly, the above-described process provides a mechanism by which a graphical network representation can be displayed to a user, allowing users to select entities of interest thereon. This can be utilised by the electronic processing device in order to determine and perform a search, allowing additional information identified by the searches to be returned to the user for viewing. This provides a straightforward mechanism for allowing users to perform searches relating to one or more related entities, and in particular, provide a graphical network representation that the user can use to select relevant entities and initiate the search. This makes it easy for an individual having little knowledge regarding different data sources and/or lacking detailed knowledge of how to search them to easily access relevant data regarding entities of interest. Additionally, the system can be utilised to rapidly search disparate data sources allowing information from a range of different sources to be included on a common network representation, thereby allowing it to be more easily visualised by the user.

A number of further features will now be described.

In one example, any additional information includes details of entities related to at least one user entity and the method includes generating a second network representation including nodes corresponding to the at least one user-selected entity and at least one related entity and connection(s) therebetween. The second network representation can be generated by modifying the first network representation by adding one or more nodes corresponding to the at least one related entity, although alternatively a new network representation could be displayed. The use of a network representation to display additional information is also not essential, and alternatively additional information could be displayed in any suitable manner, such as by displaying a document representing the additional information, or the like.

As briefly described above, in one example, when a user selects an entity, the electronic processing device can operate to display a list of a number of available searches relating to the at least one user-selected entity and then determine selection of one of the available searches in accordance with user input commands. This can be used, for example, to display a range of different databases that can be searched for information regarding the user-selected entity, allowing the user to select one or more of these data sources for the search. The searches that can be performed can be determined in any appropriate manner but in one example, this includes determining an entity type of the at least one user-selected entity and then determining the search at least partially in accordance with the entity type.

As mentioned above the electronic processing device typically determines the at least one user-selected node by determining selection of the node in the network representation using a user input device although other techniques can be used.

The mechanism by which the search query is generated will vary depending on the preferred implementation but typically this process involves using predefined rules and/or predefined scripts, for example stored in a rules engine, which set out search parameters required in order to perform the search. In this example, the process typically further includes determining if further search parameters are required to generate the search query and in response to a successful determination causing required parameters to be displayed to a user. This allows the required parameters to be determined in response to user input commands, so that the user can be prompted to provide any additional search parameters required.

Typically the first network representation is generated in response to a search process. In order to achieve this, the electronic processing system determines a search to be performed in response to user input commands. This can include, for example, having a user simply select a search from a list of available searches. Following this, the electronic processing device generates a search query in accordance with the determined search to be performed, with the search query being applied to a repository to determine details regarding a number of entities and relationships between the number of entities. This is then used to generate the first network representation.

It will be appreciated that when searching a range of different data sources, additional information may be determined in a number of different formats. Accordingly, the technique typically involves determining search results data indicative of the additional information and then analysing the search results data to identify at least one entity. The analysis process can include utilising pattern matching and/or fuzzy logic in order to identify entities and relationships defined within the search results.

For example, an entity is typically identified by determining entity details including at least one of an entity name, entity address and date of birth or incorporation, or the like, depending on the nature of entity. The entity details are then compared to details of existing entities, corresponding to existing identified entities for example in the first representation, with the entity being identified as an existing entity based on the results of the comparison. This process typically involves modifying the entity details in accordance with defined misspellings and phonetic equivalent codes so that modified entity details can be compared to existing entity details thereby preventing matches being overlooked due to misspellings, inconsistent data entry, or the like. To achieve this, the process typically involves determining a distance indicative of a difference between the entity details and existing entity details and determining an entity to be an existing entity based on the difference. Thus, for example, this can examine a distance between names based on the differences in spelling and then using this to selectively determine whether a match exists.

The additional information may be received in any one of a number of forms. Thus, for example, search results data could be in the form of a PDF file or the like, in which case the files typically require parsing to identify text corresponding to different entities. This can be performed using pattern matching or the like. Alternatively, however, the data is in the form of a mark-up data file, such as an XML (eXtensible Mark-up Language) file, or the like, in which data tags are used to identify different types of data. In this example, the method typically includes determining a document definition such as a DTD (Document Type Definition) and then determining entity details in the mark-up file using the document definition, although other suitable techniques can be used.

The search results can be received via a data communications network, for example from remote data sources, or the like.

Figure 2:
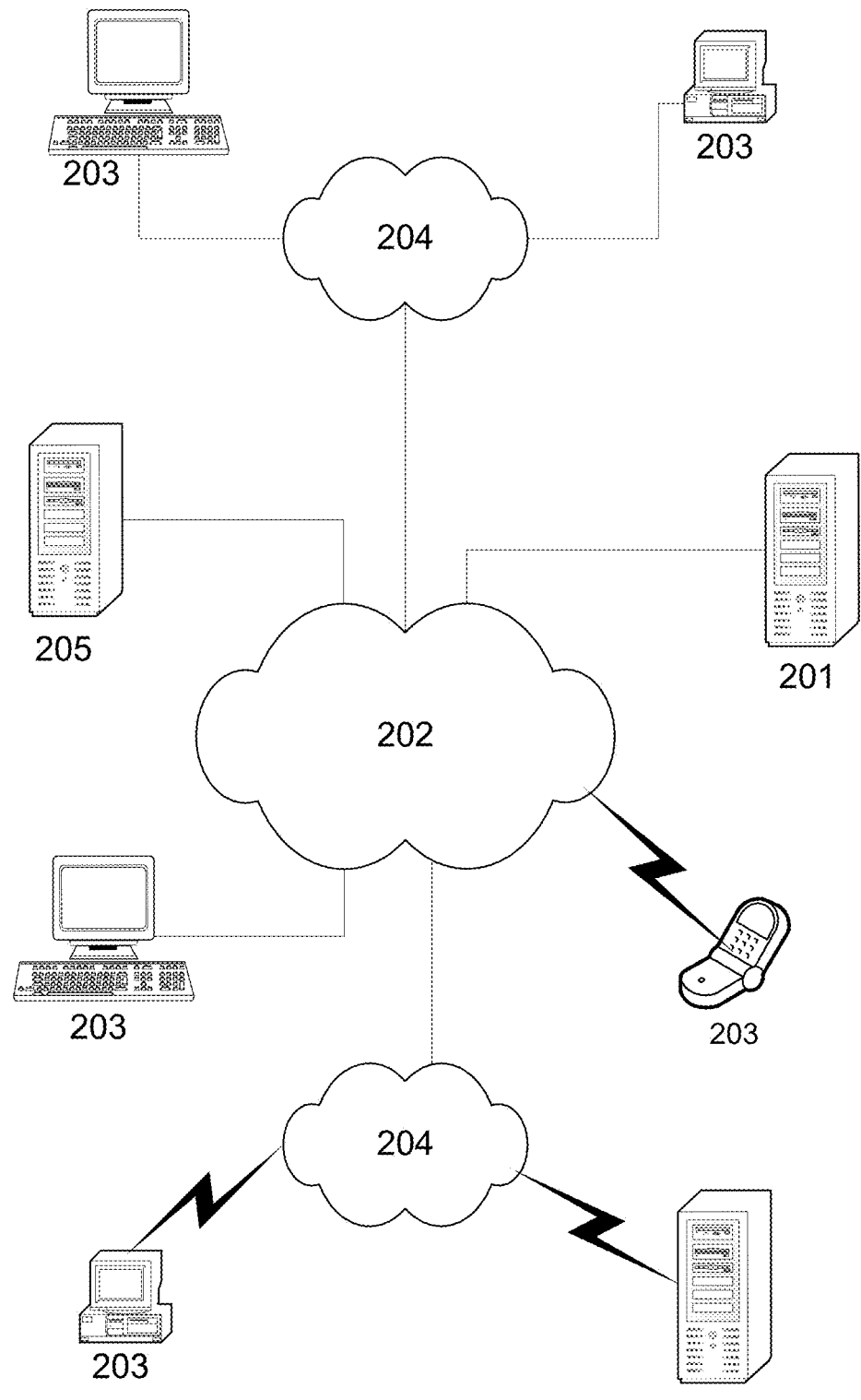
FIG. 2 is a schematic diagram of an example of a distributed computer architecture.

In one example, the process is performed at least in part using a processing system, such as a suitably programmed computer system. This can be performed on a stand alone computer, with the microprocessor executing applications software allowing the above described method to be performed. Alternatively, the process can be performed by one or more processing systems operating as part of a distributed architecture, an example of which will now be described with reference to FIG. 2.

In this example, a base station 201 is coupled via a communications network, such as the Internet 202, and/or a number of local area networks (LANs) 204, to a number of computer systems 203 and data sources 205. It will be appreciated that the configuration of the networks 202, 204 are for the purpose of example only, and in practice the base station 201, computer systems 203 and data sources 205 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In one example, the base station 201 includes a processing system 210 coupled to a database 211. The base station 201 is adapted to be used to perform tasks such as processing search requests, performing searches and providing additional details or the like, whilst the data sources are typically responsive to search requests to provide additional information. Data used in the process may be stored in the database 211 and/or may be received from the computer systems 203, or other remote devices. The computer systems 203 are therefore adapted to communicate with the base station 201, allowing data to be transferred therebetween and/or to control the operation of the base station 201.

Figure 3:
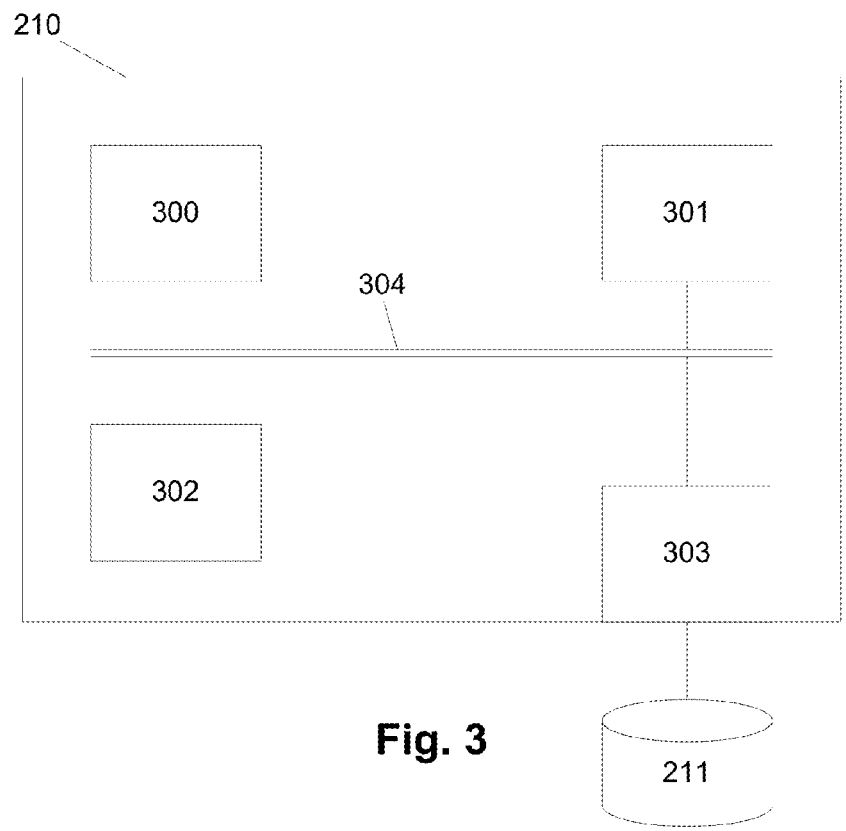
FIG. 3 is a schematic diagram of an example of a base station processing system.

An example of a suitable processing system 210 is shown in FIG. 3. In this example, the processing system 210 includes at least one microprocessor 300, a memory 301, an input/output device 302, such as a keyboard and/or display, and an external interface 303, interconnected via a bus 304 as shown. In this example the external interface 303 can be utilised for connecting the processing system 210 to peripheral devices, such as the communications networks 202, 204, databases 211, other storage devices, or the like. Although a single external interface 303 is shown, this is for the purpose of example only, and in practice multiple interfaces using various methods (e.g. Ethernet, serial, USB, wireless or the like) may be provided.

In use, the microprocessor 300 executes instructions in the form of applications software stored in the memory 301 to allow relevant processes to be performed. For example, the case of the base station 201, this includes performing searches, generating network representations, and any other required processes, such as communicating with the computer systems 203 and data sources 205. Accordingly, it will be appreciated that the applications software may include one or more software modules, and may be executed in a suitable execution environment, such as an operating system environment, or the like.

Accordingly, it will be appreciated that the processing system 210 may be formed from any suitable processing system, such as a suitably programmed computer system, PC, web server, network server, or the like. In one particular example, the processing system 100 is a standard processing system such as a 32-bit or 64-bit Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

It will also be appreciated that the data source will also typically have a similar configuration, and will typically be a server, or the like, executing applications software such as database management software, allowing searches to be performed. As such data sources are known, these will not be described in any further detail.

Whilst the base station 201 and data sources 205 are shown as single entities, it will be appreciated that the base station 201 can be distributed over a number of geographically separate locations, for example by using processing systems 210 and/or databases 211 that are provided as part of a cloud based environment.

However, the above described arrangement is not essential and other suitable configurations could be used. For example, the process could be performed on a stand alone computer system.

Figure 4:
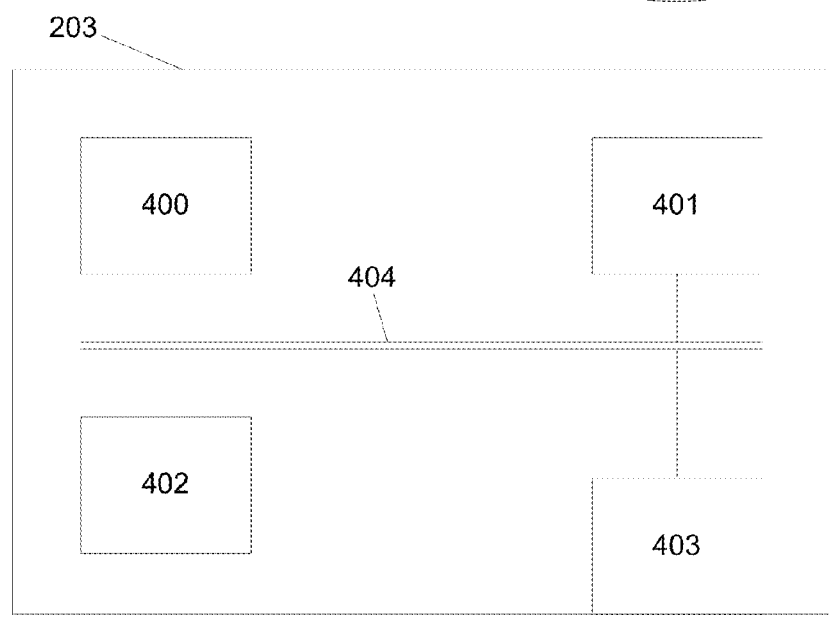
FIG. 4 is a schematic diagram of an example of an computer system.

As shown in FIG. 4, in one example, the computer system 203 includes at least one microprocessor 400, a memory 401, an input/output device 402, such as a keyboard and/or display, and an external interface 403, interconnected via a bus 404 as shown. In this example the external interface 403 can be utilised for connecting the computer system 203 to peripheral devices, such as the communications networks 202, 204, databases 211, other storage devices, or the like. Although a single external interface 403 is shown, this is for the purpose of example only, and in practice multiple interfaces using various methods (eg. Ethernet, serial, USB, wireless or the like) may be provided.

In use, the microprocessor 400 executes instructions in the form of applications software stored in the memory 401 to allow communication with the base station 201, for example to allow data to be supplied thereto and allowing network representations to be received and displayed.

Accordingly, it will be appreciated that the computer systems 203 may be formed from any suitable processing system, such as a suitably programmed PC, Internet terminal, lap-top, hand-held PC, smart phone, PDA, web server, or the like. Thus, in one example, the processing system 100 is a standard processing system such as a 32-bit or 64-bit Intel Architecture based processing system, which executes software applications stored on non-volatile (e.g., hard disk) storage, although this is not essential. However, it will also be understood that the computer systems 203 can be any electronic processing device such as a microprocessor, microchip processor, logic gate configuration, firmware optionally associated with implementing logic such as an FPGA (Field Programmable Gate Array), or any other electronic device, system or arrangement.

Examples of the information displaying process will now be described in further detail. For the purpose of these examples, it is assumed that the process is performed by the processing system 210 of the base station 201 under control of one of the computer systems 203, operated by a user. Thus, it is assumed that the processing system 210 of the base station 201 hosts applications software for performing the search and generating the network representation. Searches are performed by the base station 201, by having the processing system 210 generate a search query which is transferred to a data source 205, allowing search results to be returned. In this example, actions performed by the processing system 210 being performed by the processor 300 in accordance with instructions stored as applications software in the memory 301 and/or input commands received from a user via the I/O device 302, or commands received from the computer system 203.

It will also be assumed that the user interacts with application software executed by the processing system 210 via a GUI, or the like presented on the computer system 203. Actions performed by the computer system 203 are performed by the processor 401 in accordance with instructions stored as applications software in the memory 402 and/or input commands received from a user via the I/O device 403. The base station 201 is typically a server which communicates with the computer system 203 via communications networks, such as the Internet, or the like, depending on the particular network infrastructure available.

However, it will be appreciated that the above described configuration assumed for the purpose of the following examples is not essential, and numerous other configurations may be used. It will also be appreciated that the partitioning of functionality between the computer system 203, the base station 201 and the data sources 205, may vary, depending on the particular implementation.

Figure 5A:
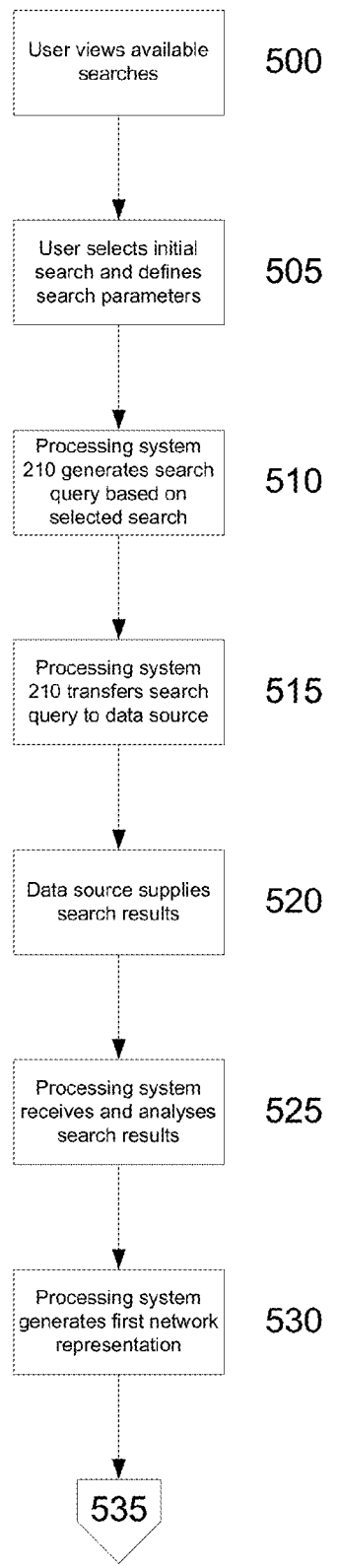
FIGS. 5A to 5C are a flowchart of a second example of a process for displaying information relating to one or more entities.
Figure 5B:
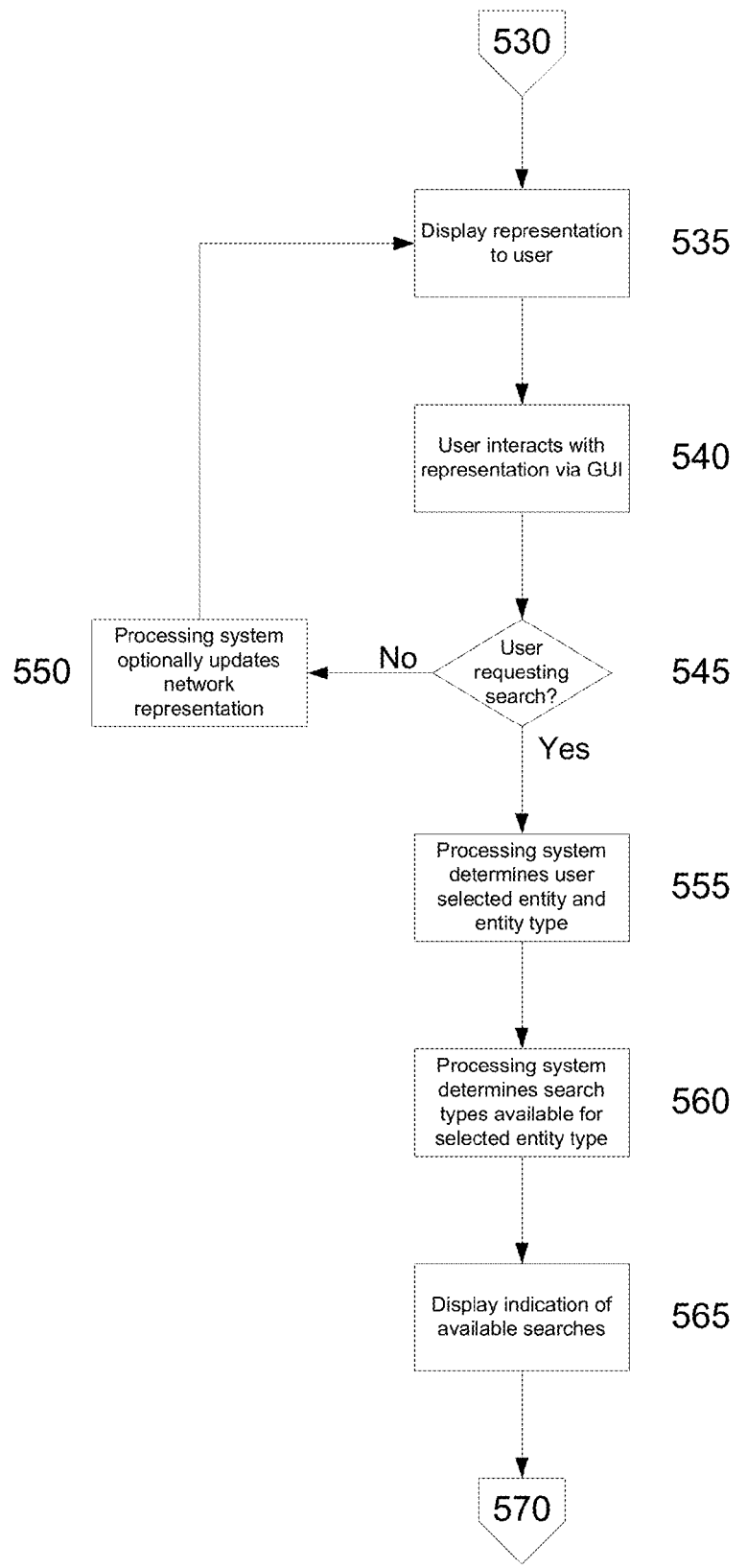
Figure 5C:
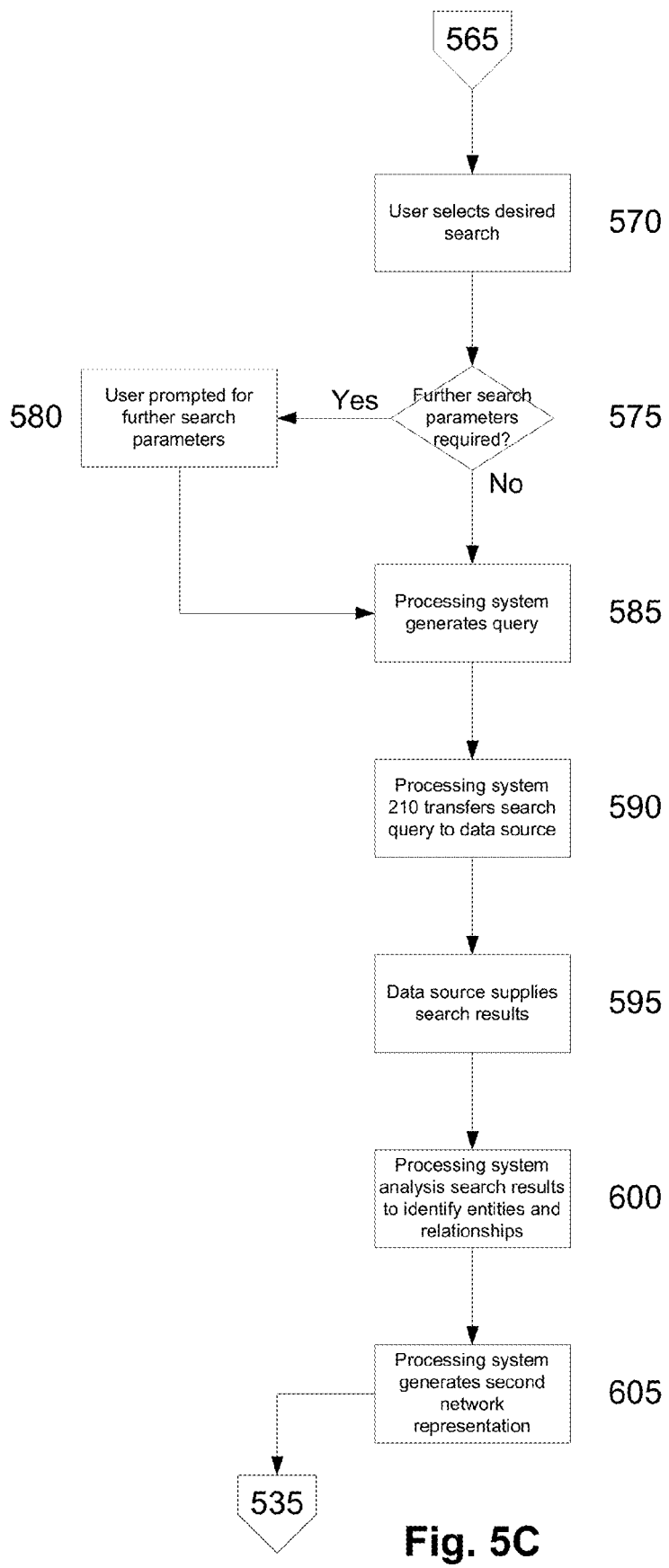

An example of a process for displaying information relating to entities will now be described in more detail with reference to FIGS. 5A to 5C.

In this example, at step 500, a user views details of available searches. This process will typically be achieved by having the processing system 210 host a website or some other representation including a list of different searches that can be performed. This will include information regarding the nature of different repositories that can be searched as well as the types of information that can be retrieved and any additional relevant information, such as details of costs associated with performing the search.

At step 505, the user selects an initial search and defines any associated and required search parameters. Typically this is achieved by utilising the selection of an option on the webpage, which then causes required search parameters to be displayed, such as details of entity names that are to be searched.

At step 510, the processing system 210 generates a search query based on the selected search and any provided search parameters, transferring the search query to a data source 205 at step 515. The data source 205 will typically be defined as part of the search with a script or other similar business rules-based process being utilised to format the search query in an appropriate way for analysis and interpretation by the respective data source 205.

At step 520, the data source 205 supplies the search results to the processing system 210. It will be appreciated that in one example, the above search process can be performed locally, so that the data source is the base station 201, in which case the data must simply be retrieved. At step 525, the processing system 210 receives and analyses the search results. The analysis is performed in order to identify entities and relationships therebetween within the search results.

The manner in which data analysis is performed will vary depending on the preferred implementation and the nature of the data. For example, the data may be received in the form of an XML file which includes an associated Document Type Definition (DTD) which defines the type of each field used in the data file. The type of field can then be used to identify entities as well as attributes of the entities. Thus, for example, an entity may be an individual or company with attributes of the entity including an entity name, ABN/ACN, or the like. Other entities can include addresses or contact details, other individuals, companies, or the like, as will be appreciated by a person skilled in the art. The analysis process may also involve using pattern matching and/or fuzzy logic, together with techniques for mitigating misspellings or phonic misidentification, as will be described in more detail below.

Figure 6:
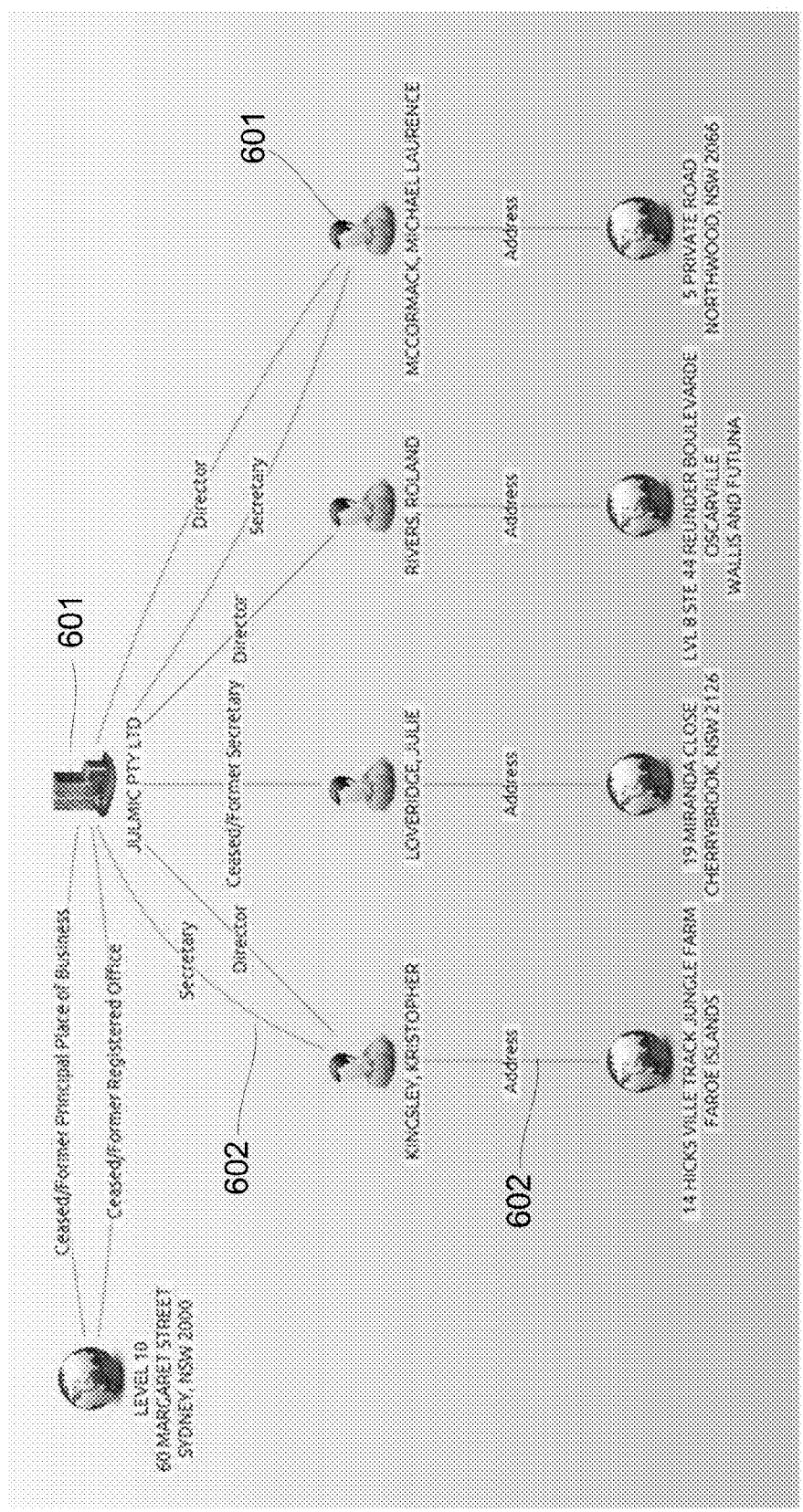
FIG. 6 is a schematic diagram of an example of a network representation.

Once the processing system 210 has identified entities and relationships from the search results, the processing system generates a first network representation at step 530. The network representation is typically implemented as part of a web page allowing this to be displayed to the user at step 535, for example by having the user's browser directed to the web page including the network representation. An example network representation is shown in FIG. 6. As shown, this includes a number of nodes 601 interconnected via relationships 602. The nodes include a different icon to represent different entity types, with information regarding the entity and nature of the relationship typically being displayed as shown.

At step 540, the user interacts with the network representation via the webpage or other graphical user interface, using an input device such as a mouse and/or keyboard. As part of this, the processing system 210 will detect the interaction, for example, by receiving indications of user input commands, and use this to assess whether the user is manipulating the representation or performing an additional search.

At step 550, if the processing system 210 has determined that a search is not being requested, the processing system may optionally update the network representation returning to step 535 to allow a modified representation to be displayed to the user. This process allows users to manipulate the representation, for example, in order to select a different node to represent a central node on the representation, to modify the position of nodes, or the like.

If it is determined at step 545 that the user is requesting a search, the process proceeds to step 555 allowing the processing system 210 to determine a user-selected entity and entity type. A search will typically be requested by having a user right click on a particular node indicating that the user wishes to perform additional searching relating to the corresponding entity.

At step 560, the processing system 210 determines search types available for the selected entity type. Thus, it will be appreciated that different searches may be performed depending on whether the entity is an individual, a company, an address, or the like. In this instance, the processing system 210 will typically access a rules engine which specifies different types of search available for each entity. This will typically include information regarding data sources relevant for the particular search, costs associated with performing a search, required search parameters or the like.

At step 565, the processing system 210 displays an indication of available searches to the user, for example, by presenting a dropdown box to the user via the web page, allowing the user to select a desired search at step 570.

At step 575, the processing system 210 determines if further search parameters are required and if so, prompts the users to provide the search parameters at step 580. This can include providing required additional information regarding an entity, approving search costs or the like.

At step 585, the processing system 210 generates a search query and transfers the search query to a relevant data source 205 at step 590. This allows the data source 205 to perform the search and supply results at step 595. Again, the results of the search are typically analysed to identify entities and relationships with these then used to generate a second network representation at step 605. The process then returns to step 535 allowing the representation to be displayed to the user.

Accordingly, it will be appreciated that in this example, an initial search is performed to generate a first network representation. The initial search can be performed in any appropriate manner, such as by having the user select a predefined search and provide any required search parameters. The search is performed with results of the search being used to generate a network representation which is then displayed to the user. The user can then provide input commands to select a node allowing a further search to be performed for that respective user-selected entity.

In order to achieve this, the processing system can simply display a list of available searches for a given entity type and then display these searches to the user. This obviates the need for the user to understand what different data sources are available and the type of data search that can be performed on each data source. Having selected a search, this can then be performed allowing additional information to be displayed to the user, for example, by updating the network representation.

Figure 7A:
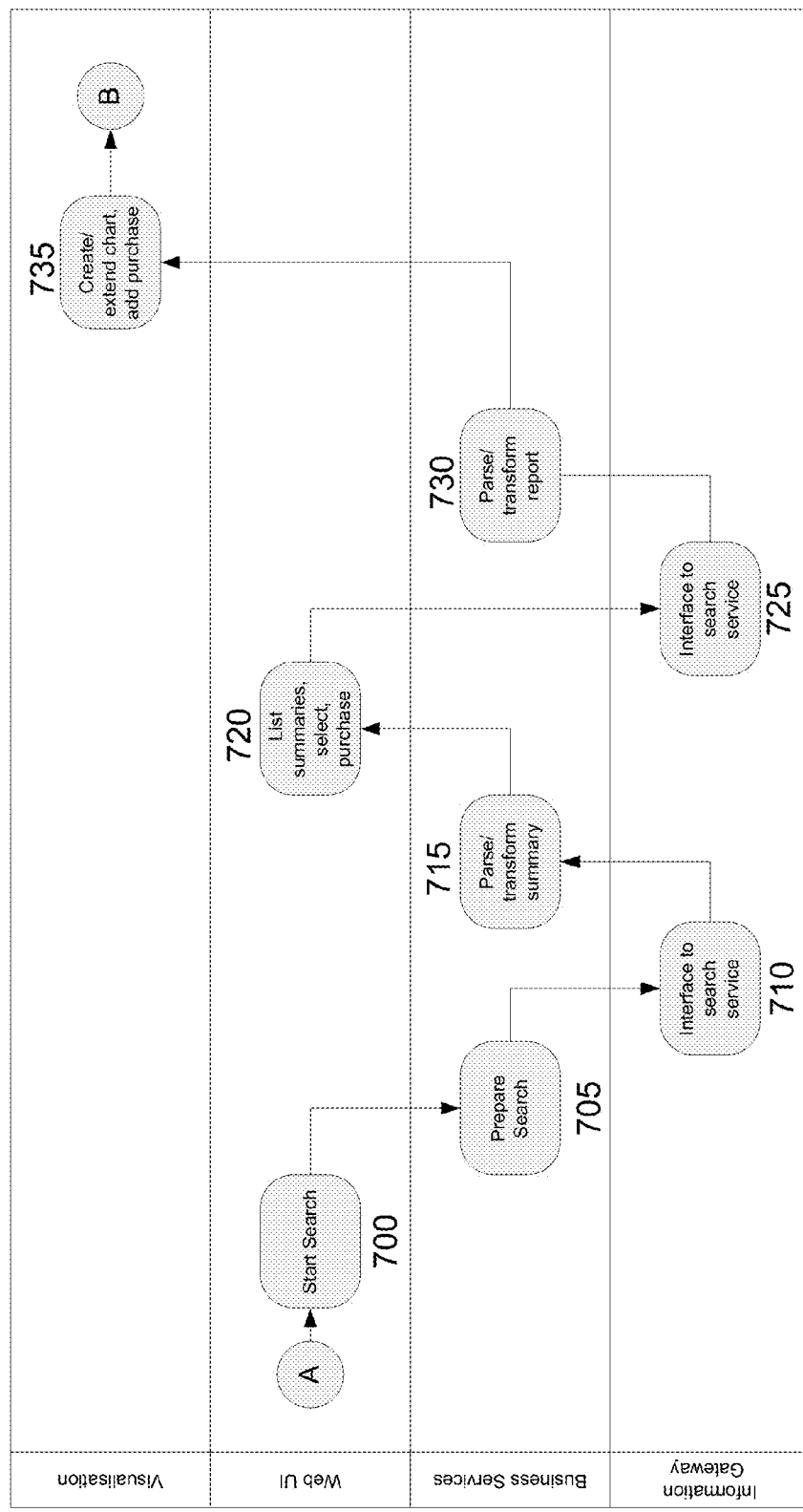
FIGS. 7A and 7B are a flowchart of a third example of a process for displaying information relating to one or more entities.
Figure 7B:
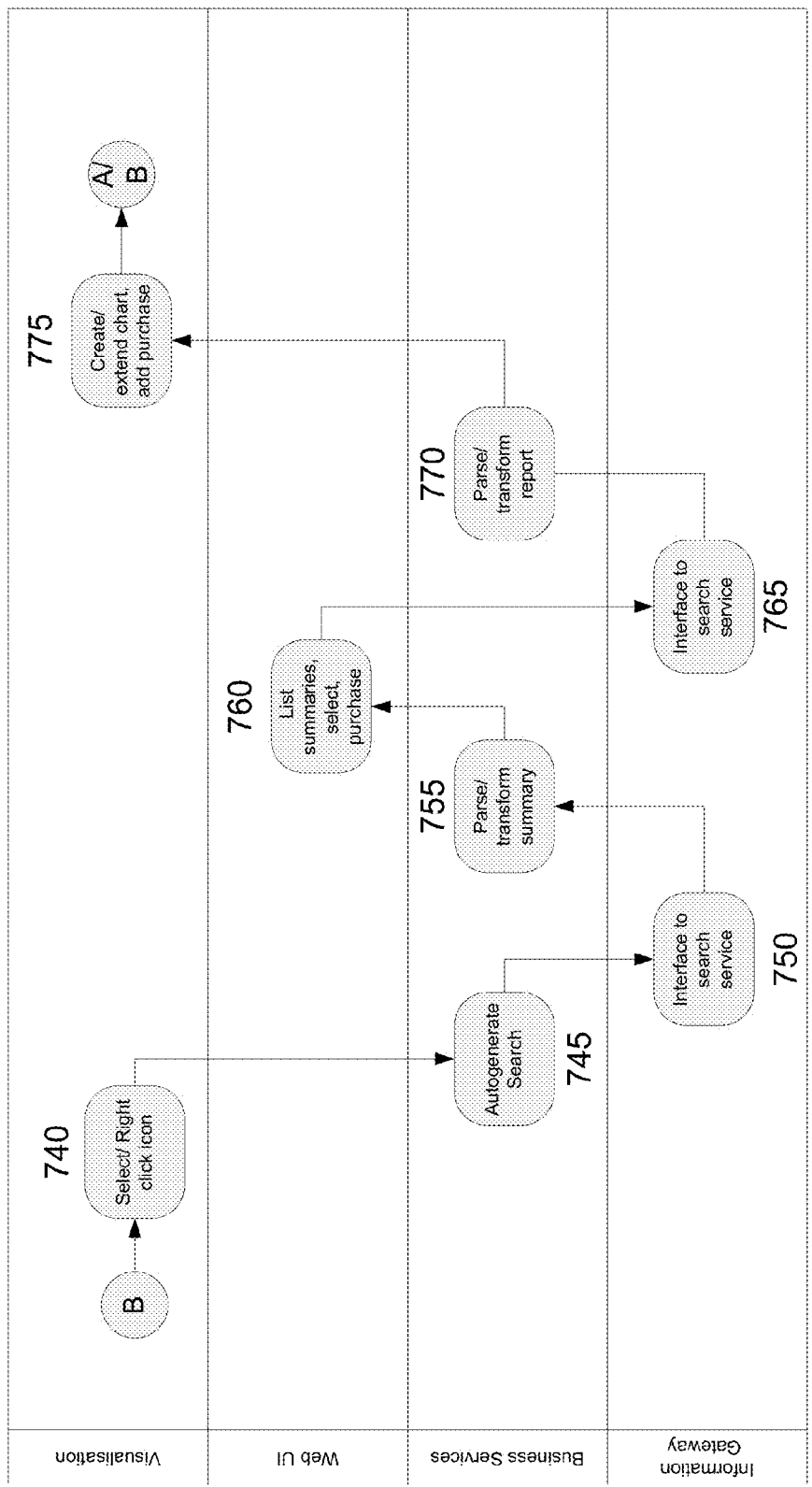

A further specific example will now be described with reference to the flowcharts shown in FIGS. 7A and 7B and the screenshots of graphical user interfaces, in the form of web pages, that are presented to a user during the process, as shown in FIGS. 8A to 8J.

For the purpose of this example, an overview is described with respect to the purchasing of reports from ASIC (Australian Securities and Investments Commission), but it will be appreciated that this is not intended to be limiting and in practice any data source can be used.

Figure 8A:
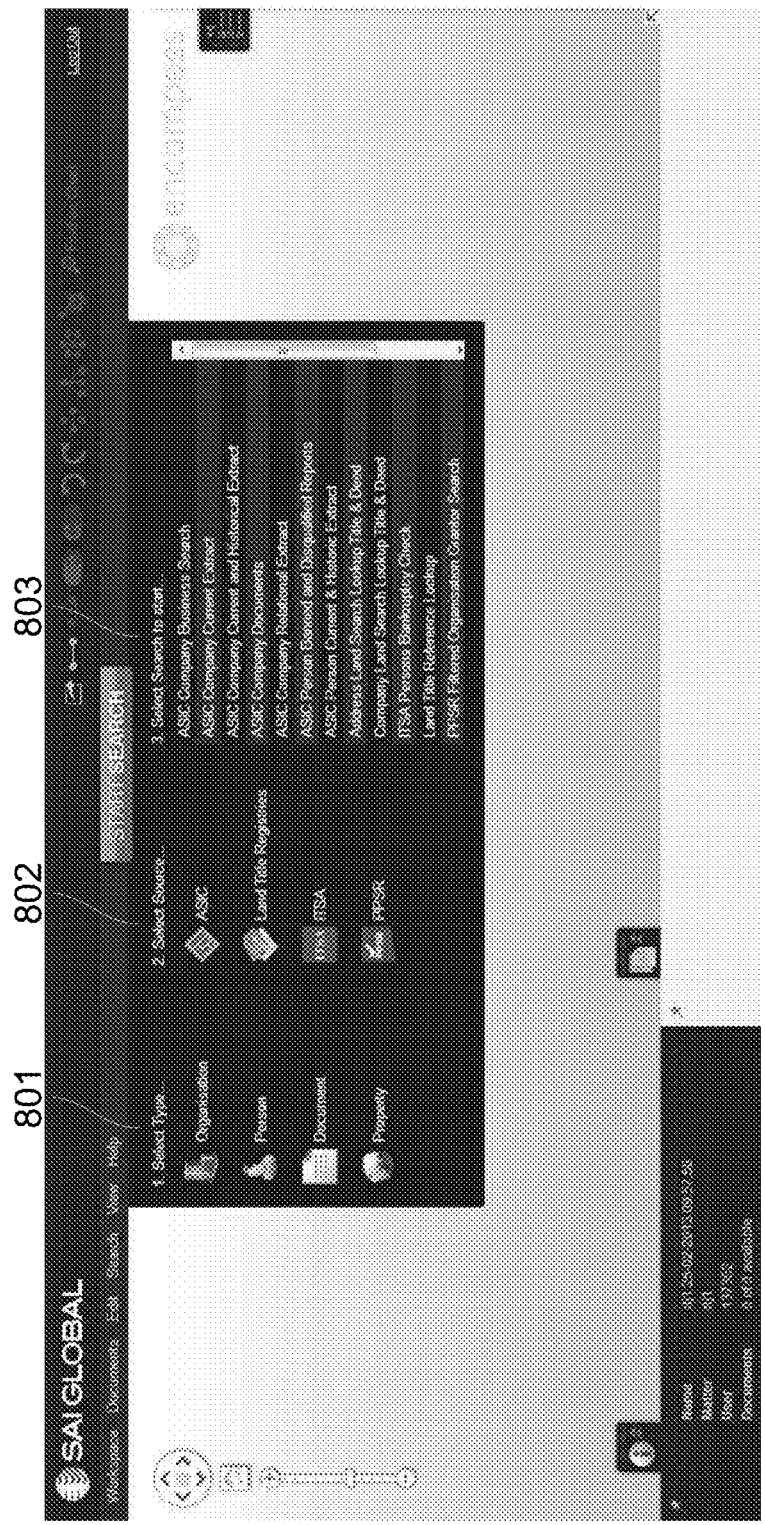
FIGS. 8A to 8J are schematic diagrams of a graphical user interface used in the process of FIGS. 7A and 7B.
Figure 8B:
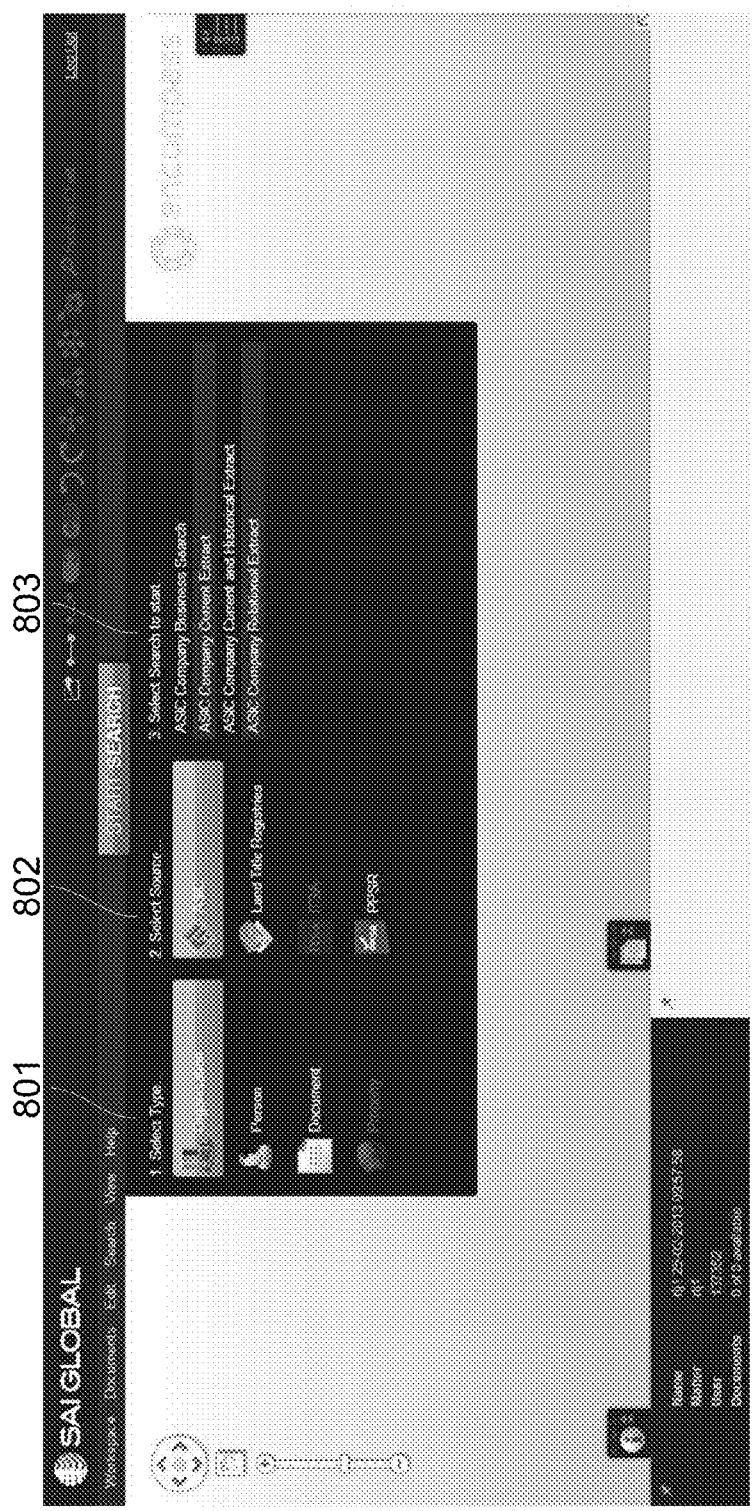
Figure 8C:
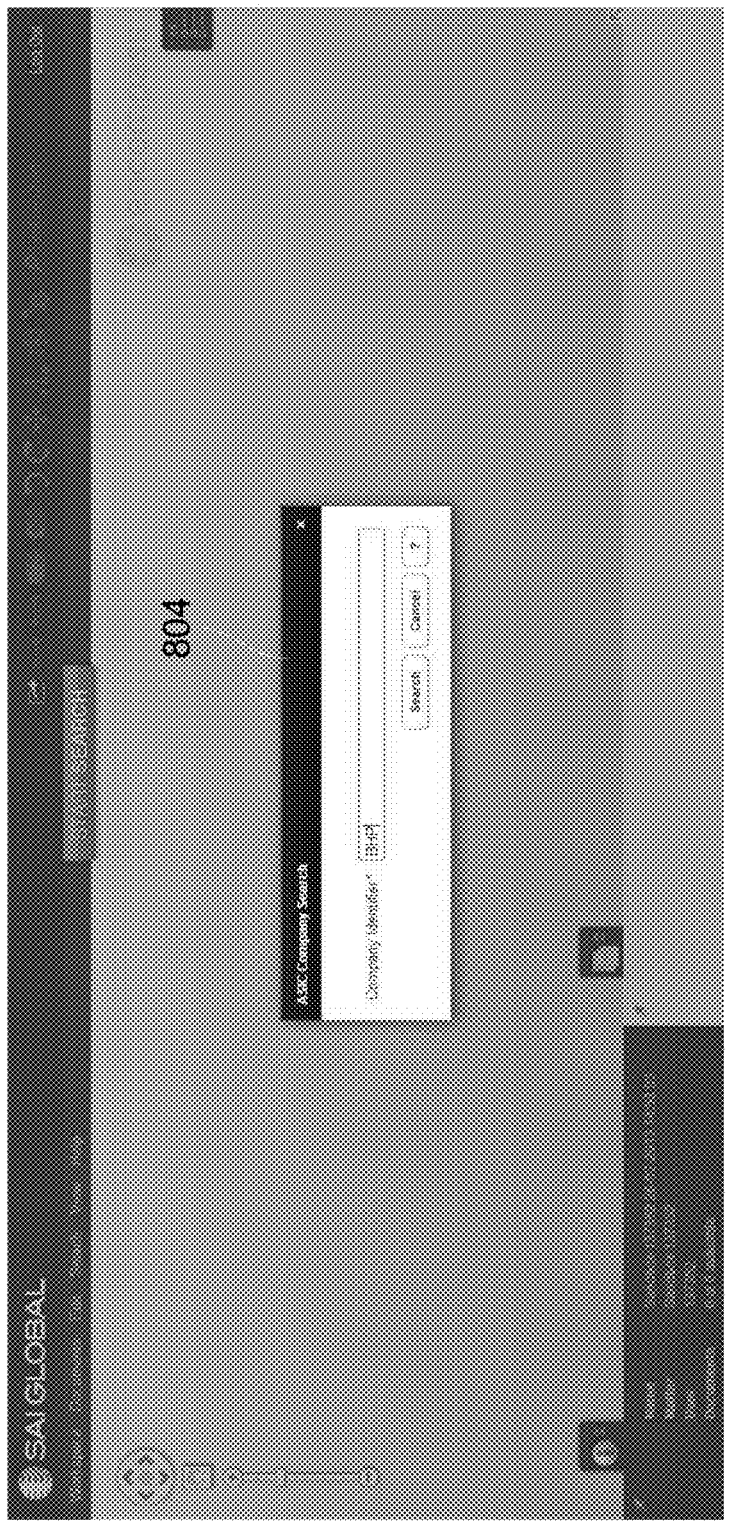

In this example, at step 700 a user selects to start a search causing the Graphical User Interface (GUI) shown in FIG. 8A to be presented to the user. This GUI interface includes a search type list 801 allowing the user to select a type of search, such as a search on particular types of entities such as organisations, persons, documents, properties, or the like. The GUI also allows displays a data source list 802 allowing the user to select a data source 205 to be used, such as any one or more of a number of different databases and a search type list 803, allowing a particular type of search to be selected. During this process, when the user selects to start a search, the user will be provided with details of the entity types and available sources. After selecting the entity types and source a list of valid reports for that entity and source is displayed at 803 allowing the user to select a respective report, as shown in FIG. 8B.

At step 705, the search is prepared by generating a search string which is transformed into a valid query structure for the selected source and report type utilising a script associated with the selected report type. It will be appreciated that the scripts can be generated in any appropriate manner, such as based on predefined scripts generated for the particular entity and source type. As part of this process the user may be required to provide additional information via way of pop-up prompts 804 as shown, for example, in FIG. 8C. This can include information such as a name of an entity of interest or the like.

Figure 8D:
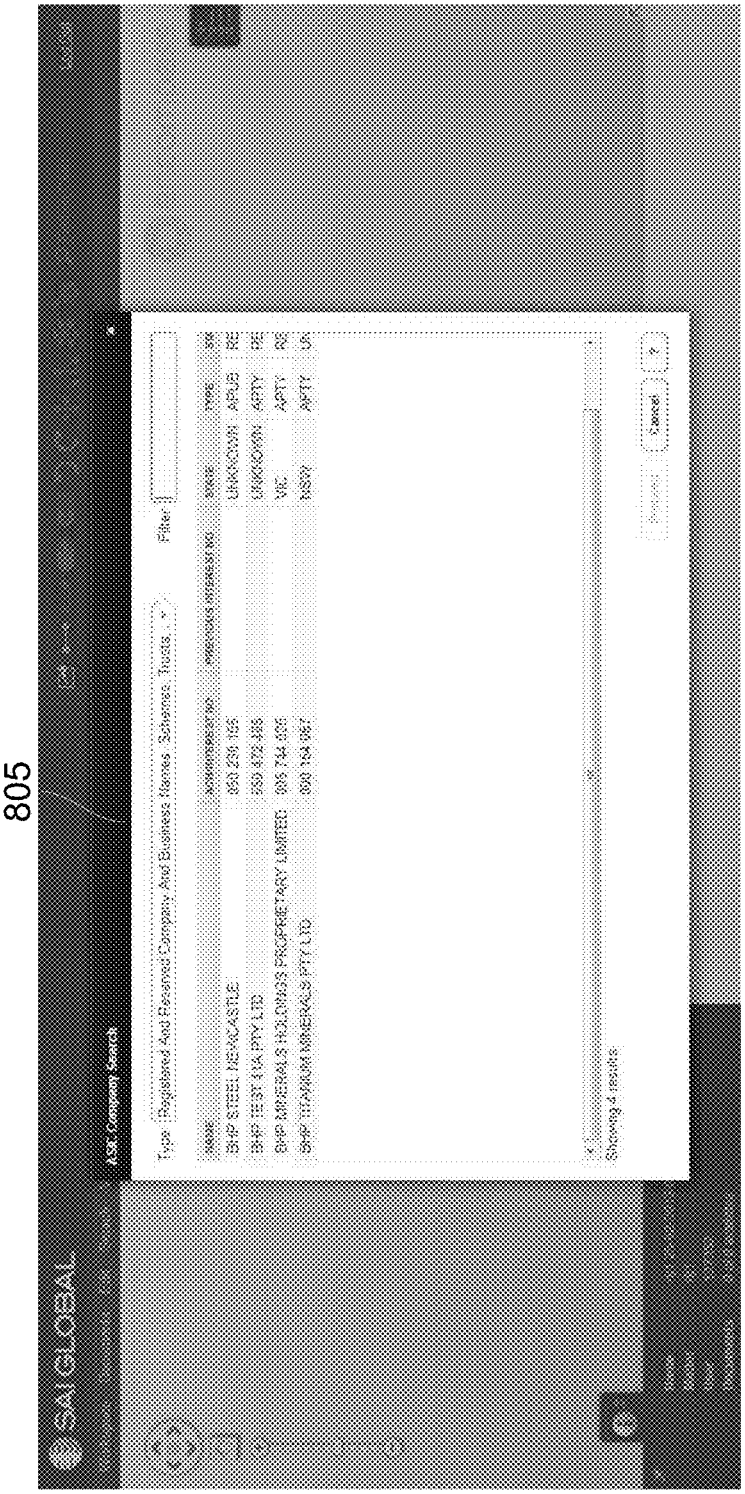
Figure 8E:
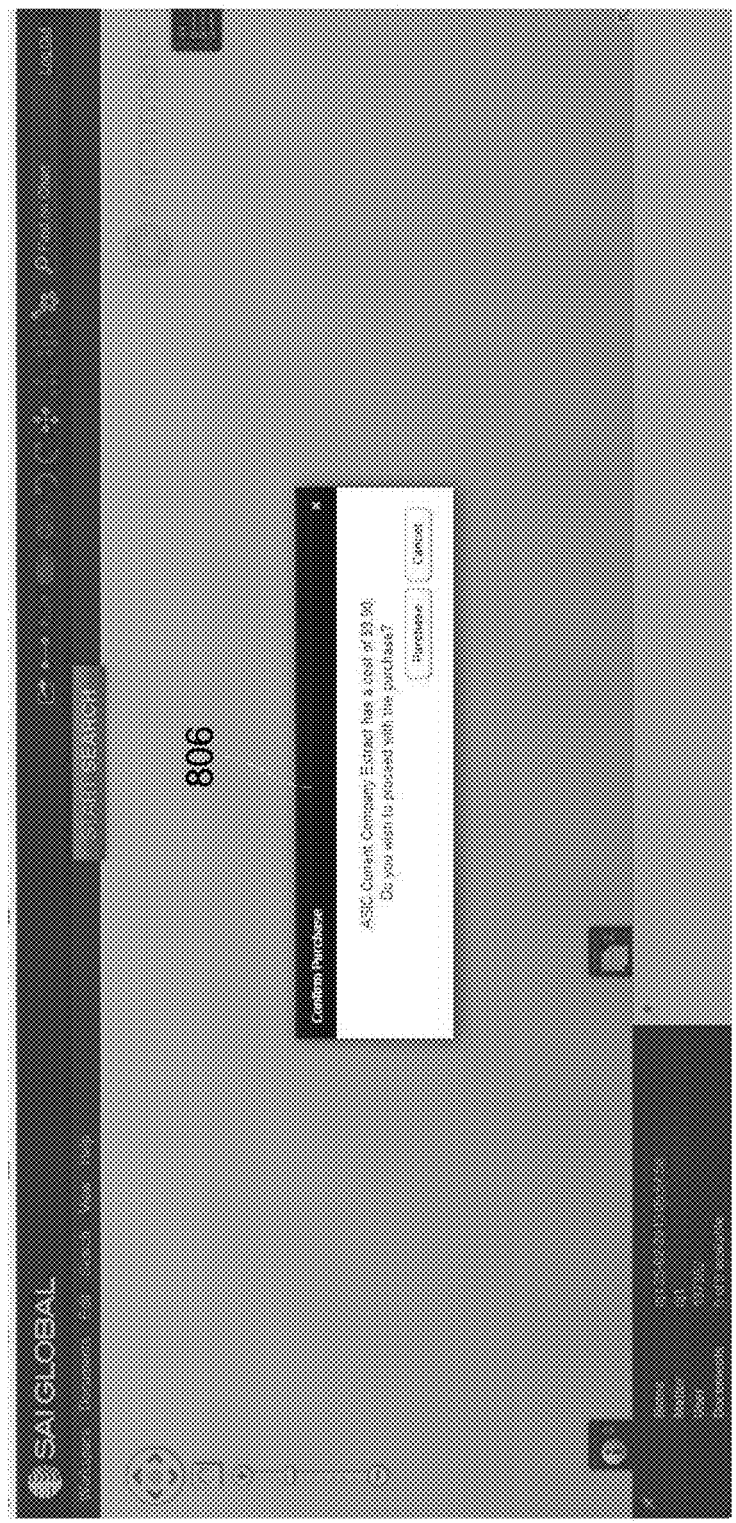

At step 710, the processing system 210 interfaces with a data source 205 in the form of a search service, passing the search through a gateway to allow the relevant search service to perform the search and return search results. The processing system 210 parses the search results at step 715 and transforms the results into a summary list 805, showing a list of potentially relevant entities, which is displayed to the user as shown in FIG. 8D, allowing the user to select from the summary list. Thus, for example, the search may return a number of potential matches which can be displayed to the user allowing the user to ensure the search is performed on the relevant entity. At this stage, the user is typically presented with a prompt 806 including information regarding with a cost associated with the search, and allowing the user to confirm that searching is to proceed, as shown, for example, in FIG. 8E.

Assuming the search is to proceed, at step 725, the search query is transferred to the search service with results of the search being passed back to the processing system 210 allowing the processing system 210 to parse the results and transform the results into a predetermined format.

In this regard, records are typically held in an internal XML file format with the search results being presented as a report in a standard format such as a PDF. At step 735, the user can then select to create a network representation, which can then be displayed to the user. As part of this process, the processing system 210 process automatically extracts all entities within the search results allowing these to be used in generating the network representation. If this is a new chart, the entity that is the focus of the report is charted as shown by the primary node 807, together with any other associated entities 808 determined based on the data record, such as ownership, address, associated entities or persons, or the like, and corresponding relationships 809. If this is an existing chart that is being extended, then the entities returned by the current search are checked against those in the chart already and it is determined if these are the same, in which case they are merged together.

Figure 8F:
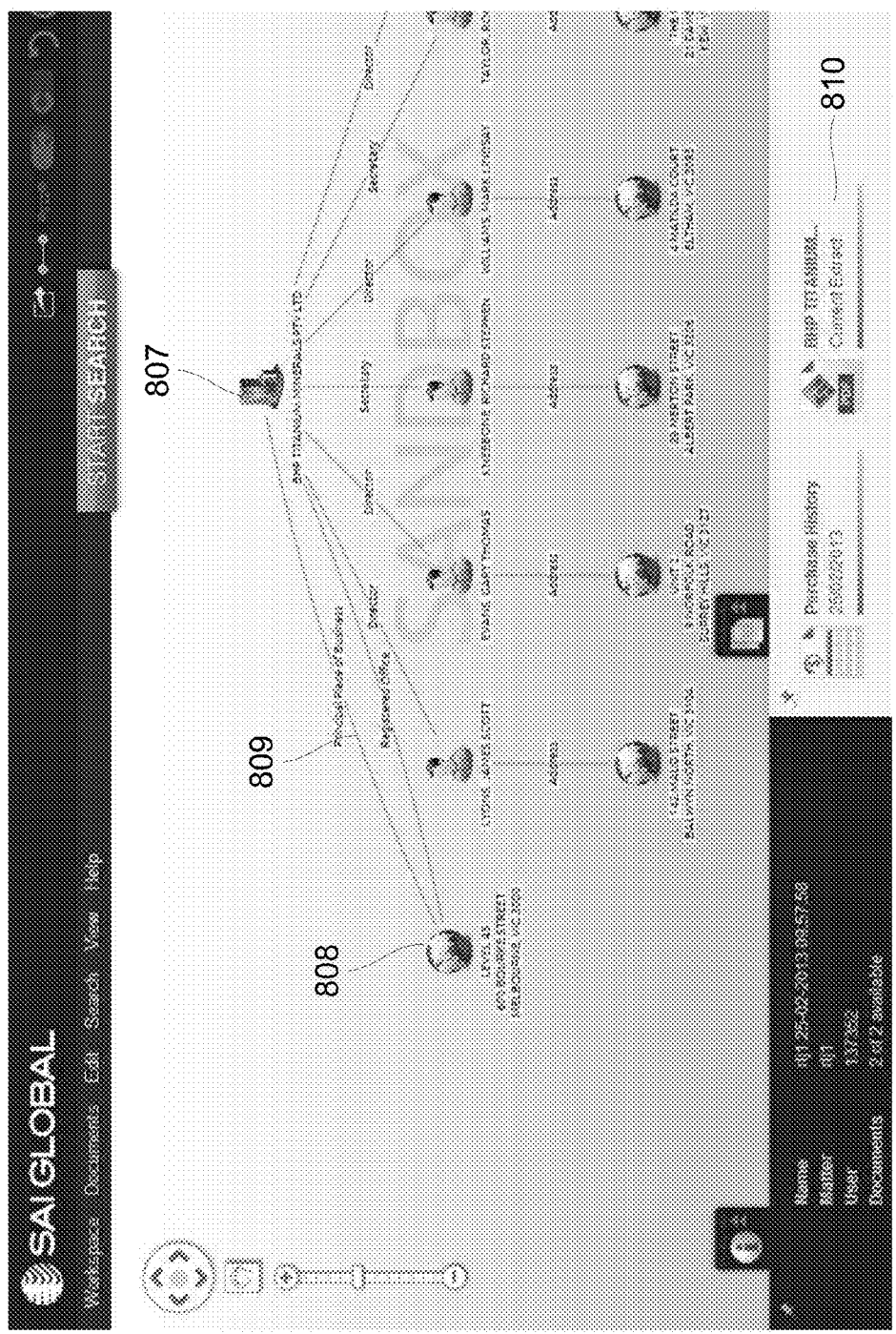

Any purchased reports utilised in generating the charts can be shown along the bottom of the chart as shown at 810, for example, in FIG. 8F. This allows users to select the reports and view the original report, for example as a PDF file or the like, allowing the user to view the search results and any additional information, in a native format.

Figure 8G:
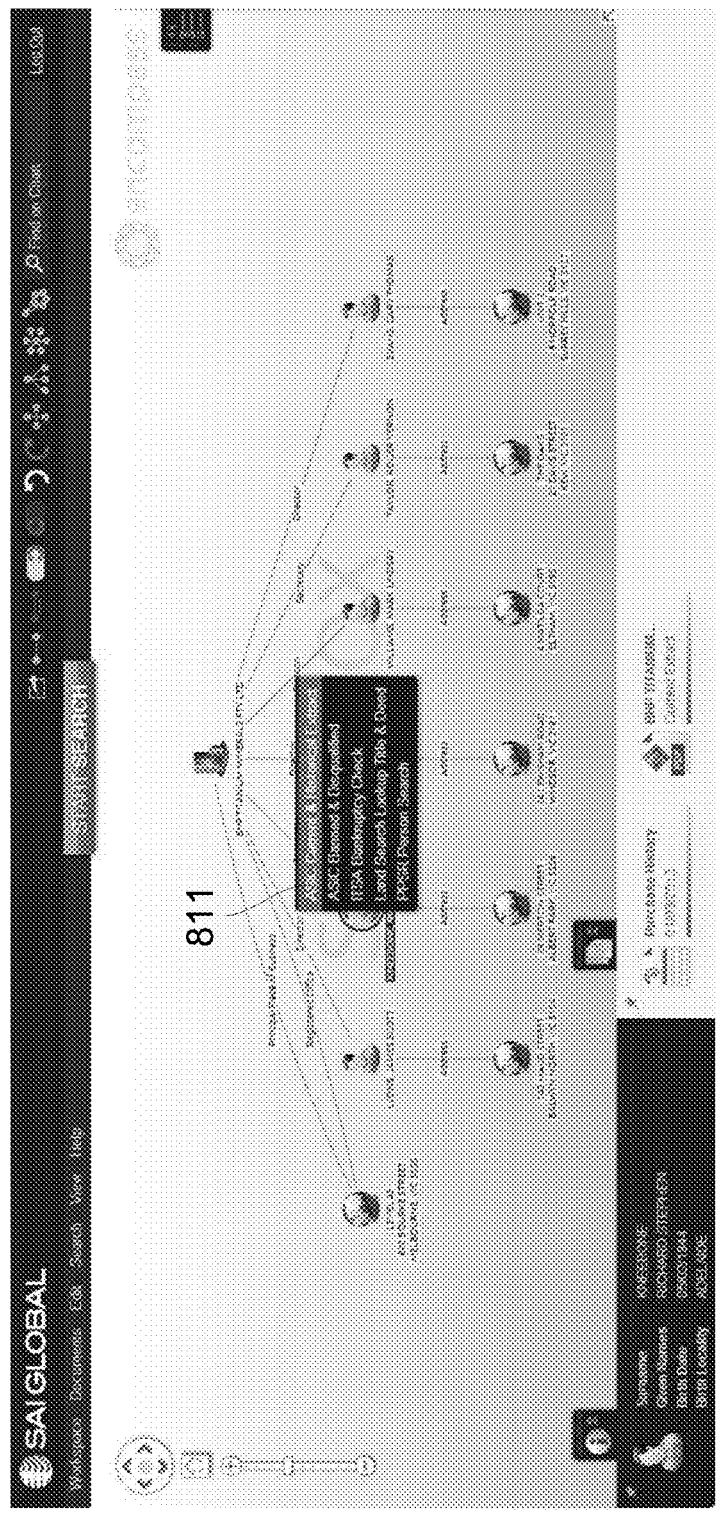
Figure 8H:
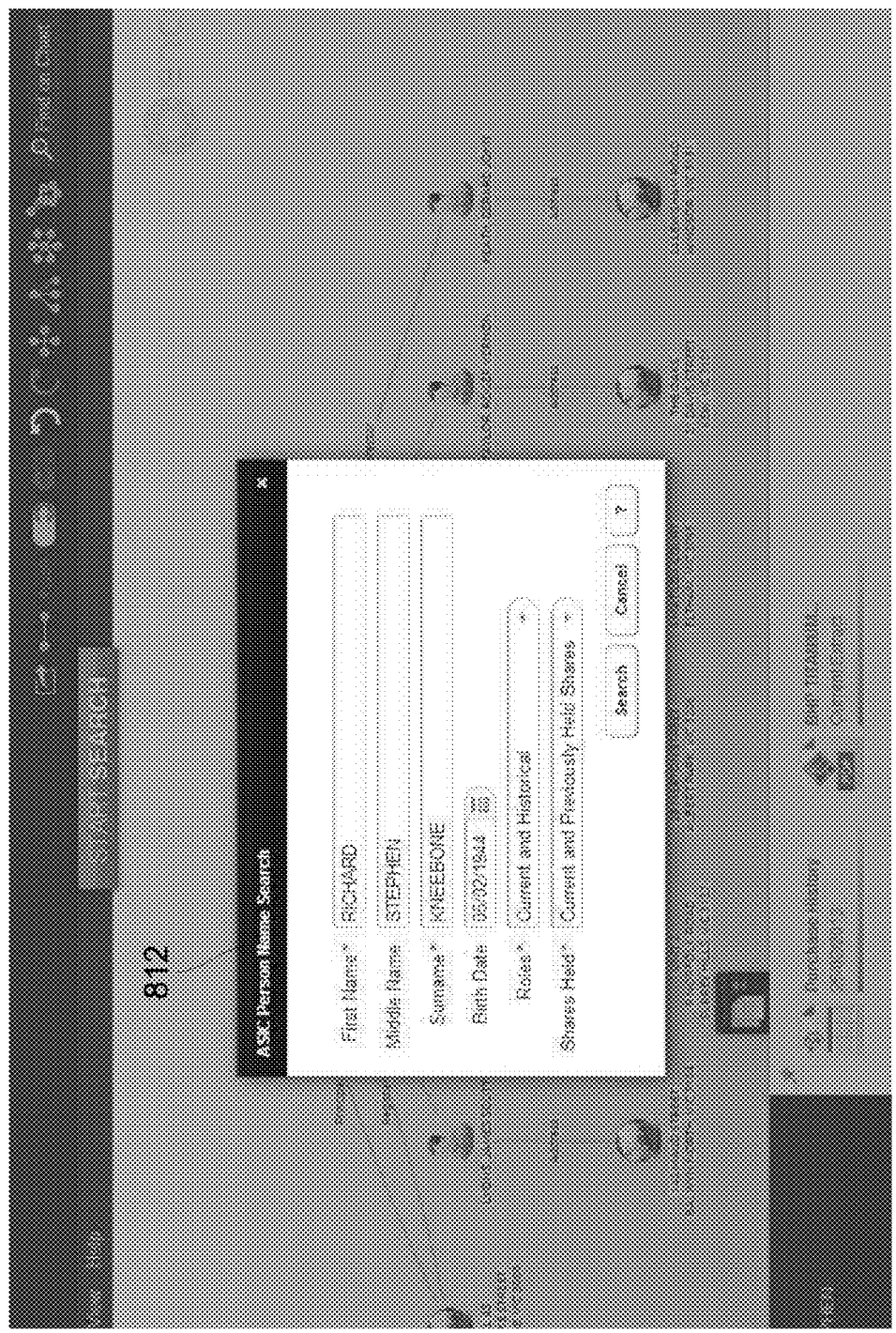
Figure 8I:
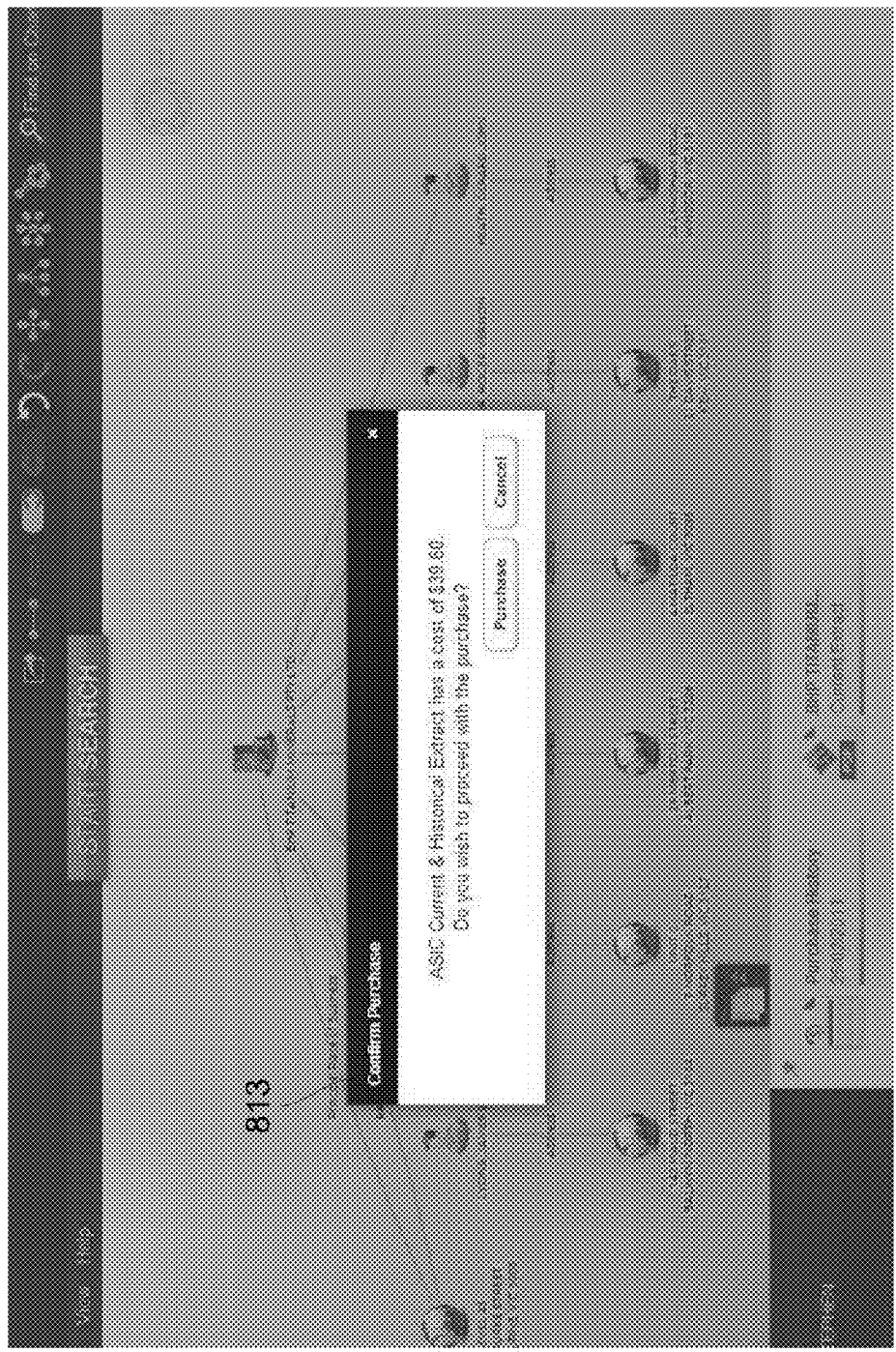

In the event that the user requires additional information associated with an entity that is represented on the chart, this can be achieved by having the user right click or select the entity at step 740. A list of possible reports 811 will then be displayed as shown in FIG. 8G, allowing the user to select a relevant report. At step 745, the processing system 210 autogenerates a search with parameters being displayed to the user, as shown by the prompt 812 in FIG. 8H. Assuming the user confirms to proceed, the processing system 210 interfaces with the search service at step 750 with results being supplied at step 755. If required, the processing system 210 will then typically generate a list of available summaries to the user at step 760, allowing the user to select a relevant entity, in a manner similar to that described above. The processing system 210 then generates a prompt 813 allowing the user to confirm purchasing of the report is to proceed, as shown in FIG. 8I.

Figure 8J:
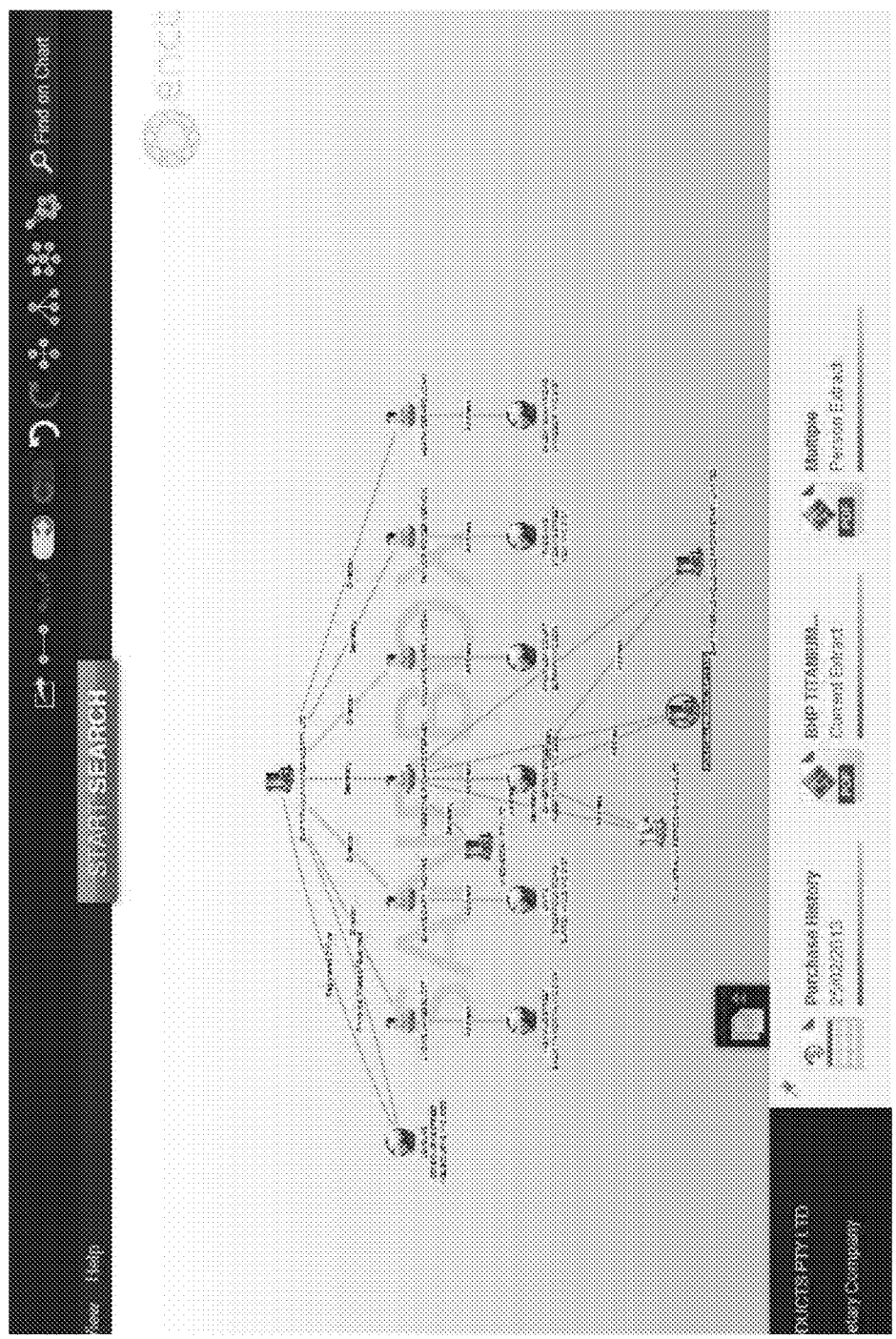

Assuming the search is approved, the search can then be performed at step 765 with results of the search being transferred back to the processing system 210 at step 770, allowing additional information to be added on to the chart at step 775. The updated chart can then be displayed to the user as shown in FIG. 8J.

As discussed above, when a search is performed, the results are analysed to determine if an identified entity corresponds to an existing entity. Matching identities ('does this electronic record refer to same physical entity—e.g. person or company, as that record, or does it match my query?') is difficult. One complicating factor is that people spell their names and addresses inconsistently. However, even if a name is spelt the same in two places, it does not necessarily refer to the same person, a situation that is especially true for common names (e.g. John Smith).

The recognized way to identify an entity such as a person is to match across a number of attributes. The gold standard for government use is the combination of: name, data of birth (DOB), and place of birth, which is why this information is often required on official identity documents, such as passports. However, in public data such as that provided by ASIC these three attributes are not necessarily included. Furthermore, different registers offer different attribute combinations and it is therefore necessary to available data when making comparisons, either during searching or when determining if there are duplicates on a chart.

Additionally, there is also the issue of matching different attributes across records for example due to inconsistencies (deliberate or otherwise) within attributes. Fuzzy logic, a branch of artificial intelligence has been shown to be effective in combining uncertainty from a number of elements, such as name, DOB and address to come up with a combined certainty level, representing the likelihood of a match. Business rules can then be used to determine the action to be taken, such as whether to combine data for matching entities.

In one example, the current process measures the distance between the individual attributes of two records and hence determining the extent to which they are or are not the same. This is performed before the attributes can be combined using fuzzy logic to determine if two entities extracted from a register/product do refer to the same physical identity.

The approach typically involves, for each entity type (personal/organisation name/ACN/date/address/ . . . ), using rules to define a distance between two instances, such Richard L Jones vs Richard Lloyd Jones. Fuzzy logic is then used to define a likelihood that the entities are 'same', 'maybe' or 'different'. These values are then combined and compared to a threshold allowing a decision to be made.

Figure 9:
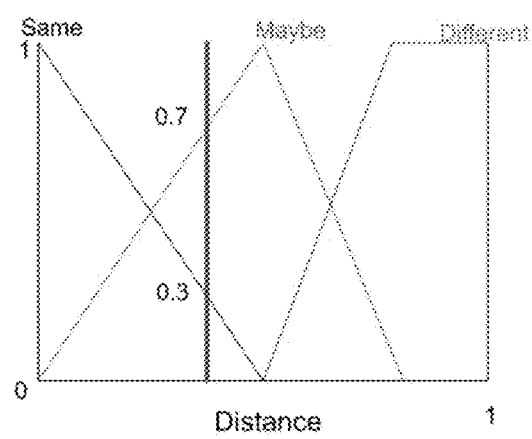
FIG. 9 is a schematic diagram of a graph representing how fuzzy values are utilised in order to determine a likelihood of a match.

For example, the process will compare different attributes and use defined values such as those set out below in Table 1 and graphically in FIG. 9.

TABLE 1

|  | Same | Maybe | Different |
|---|---|---|---|
| Same DOB | 0.3 | 0.7 | 0.0 |
| Same Name | 0.9 | 0.1 | 0.0 |
| Combined | 0.6 | 0.4 | 0.0 |

Rules are then applied to ascertain if the entities match, and example rules are as follows:
  Rule 1: if (FDifferent=0 & FSame>FMaybe) & Customer_type='info broker' then Conclusion=Same
  Rule 2: if (FDifferent=0 & FSame>0.75) & Customer_type='investigation' then Conclusion=Same
  Rule 3: if (FMaybe>0 & FSame>FMaybe) & Customer_type='investigation' then Conclusion=Maybe
  Rule 4: if FSame=1 then Conclusion=Same
  if Customer_type='info broker' then you conclude using Rule 1 the two are the same
  if Customer_type='investigation' then you conclude using Rule 3 the two maybe the same The name matching process includes generating a phonetic code representing the name, allowing the comparison to be performed at least partially on the basis of the phonetic code. In one example, the code is an alphabetic code, although other codes could be used. The method can take into account that the coding can never be completely correct and the method stores the names and matching codes in a table for look-up. The table can be maintained separately and improved by other processes. It can also include other important information.

The process also combines multiple approaches recognising that when comparing two non-identical names that there are two potential points of difference:
  words may be similarly spelt; and,
  words may sound similar.

Figure 10:
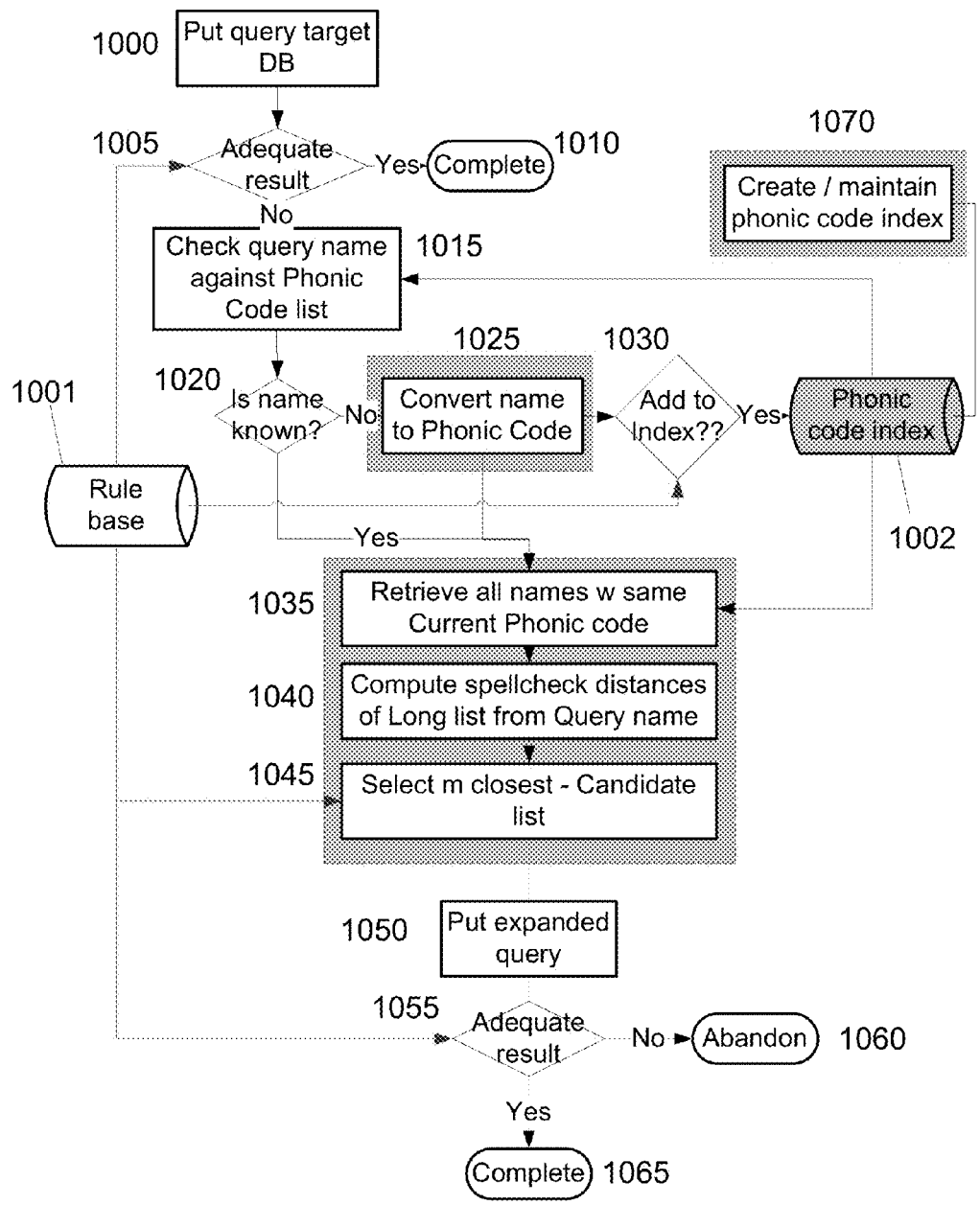
FIG. 10 is a flowchart of an example of a process for phonic name matching.

An example of a process for performing name matching will now be described in more detail with reference to FIG. 10.

For the purpose of this example, rules used in performing the name matching are stored in a rule base 1001. A list of alternative family names, based on spelling similarities, selected from a large number T (approximately 170,000) of known family names, is determined. Prior art techniques for comparing names, such as the Levenshtein algorithm give a measure of the distance between two words based on spelling. However it involves T comparisons and so is not practical for name checking in real-time. Accordingly, the T names are then coded as phonic codes at step 1070, with the resulting phonic codes (approximately 37,000 codes), being stored in a phonic code index 1002. The process of generating phonic codes will be described in more detail below with reference to FIG. 11, but by way of example, Smith, Smid, Smidt, Szmidt, Szmyd, Snead are all coded as SMID.

Each phonic code is matched by MP words (MP<<T: mean 4.6 words, mode 2, maximum 167), so by matching codes instead of entire names, this vastly reduces computation requirements. Once a code has been determined, all names with same phonic code can be used to then compute the distance to the relevant name using the Levenshtein algorithm. Matches are then compared based on distances between the name and the names having the same phonic code, with a threshold cut-off being used to define a target list, which can then be used in further searches.

Accordingly, in this example, at step 1000, the processing system 210 generates the search query and transfers this to the relevant data source database 205. At step 1005, the processing system 210 assesses the search results and determines if a match to an existing identify has been identified. This is typically performed in accordance with rules stored in the rule base 1001 which will include information regarding the name frequencies, user, supplier, and customer characteristics. The rules base 1001 is maintained by the processing system 210 and is utilised in order to allow fuzzy matching to be performed as described above.

If it is determined that a match occurs the process is complete at step 1010, otherwise the process moves on to step 1015 at which point the processing system 210 checks a name present in the search query results against a phonic code list. The processing system 210 determines if the name is known from the phonic code list and if not proceeds to step 1025 to convert the name to a phonic code, as will be described in more detail with reference to FIG. 11. In essence this process generates a phonic code based on the name identified in the search results, so that it can be compared to phonetic equivalent names stored as part of the phonic code index 1002.

At step 1030 the processing system 210 determines if the name is to be added to the index, which is typically achieved by displaying the phonic code to an operator allowing the operator to confirm that the phonic code is correct. Assuming this to be the case, the phonic code is added to a code index at step 1002. It will be appreciated that the phonic code index is created and maintained as shown generally at step 1070.

Once converted to a phonic code at step 1035, the processing system 210 retrieves all names with the same current phonic code and then calculates a spell check distance representing a spelling difference between the returned search query name and the names represented by the different phonic codes. At step 1045, using rules from the rule base 1001, the processing system 210 selects the m closest codes and uses this to form a candidate list. An expanded query is then used at step 1050 to determine whether search results have correctly identified an individual. If an adequate results is obtained at step 1055, then the process completes at 1065, otherwise the process is abandoned at step 1060 and it is determined that the entity is a new entity.

Figure 11:
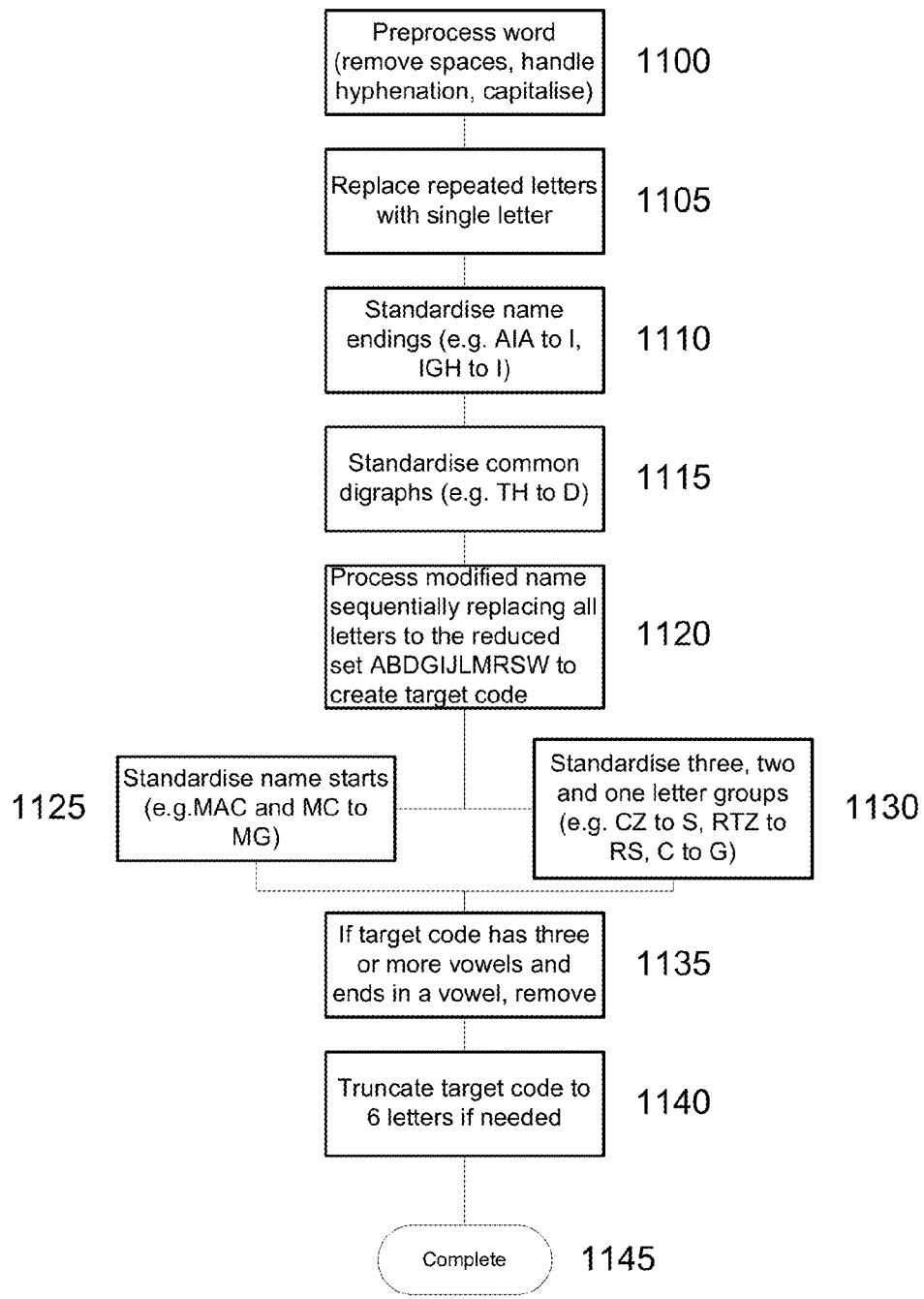
FIG. 11 is a flowchart of an example of a process for converting a name into a phonic code.

The process for generating a phonic code version of a name will now be described with reference to FIG. 11.

In this example, at step 1100, the processing system 210 pre-processes a word by removing spaces, accounting for hyphenation and capitalisation. The processing system 210 then replaces repeated letters with a single letter and then moves on to standardise name endings at step 1110. At step 1115 the processing system 210 standardises common diagraphs, for example, by converting 'th' to the letter 'd'.

At step 1120, the process processes the modified name sequentially replacing all letters to a reduced set of letters to create a target code.

The processing system then standardises name starts at step 1125 and two, three and one letter groups at step 1130. The processing system 210 then determines if a target code has three or more vowels and ends in a vowel in which case this is removed. Finally, the target code is truncated to six letters if needed.

This coding will, for example, encode the names Smith, Smid, Smidt, Szmidt, Szmyd, Snead as SMID and it will therefore be appreciated that this provides a mechanism for translating names into codes allowing phonetically similar names to be identified.

It will be appreciated that matching issues arise not just with entity names, but also addresses, which can also be used inconsistently. To account for this, address matching generates a distance between two addresses by combining differences between the different elements within an address, such as.

Number
Street name
Street type
Town/Suburb
Post code
State

Figure 12:
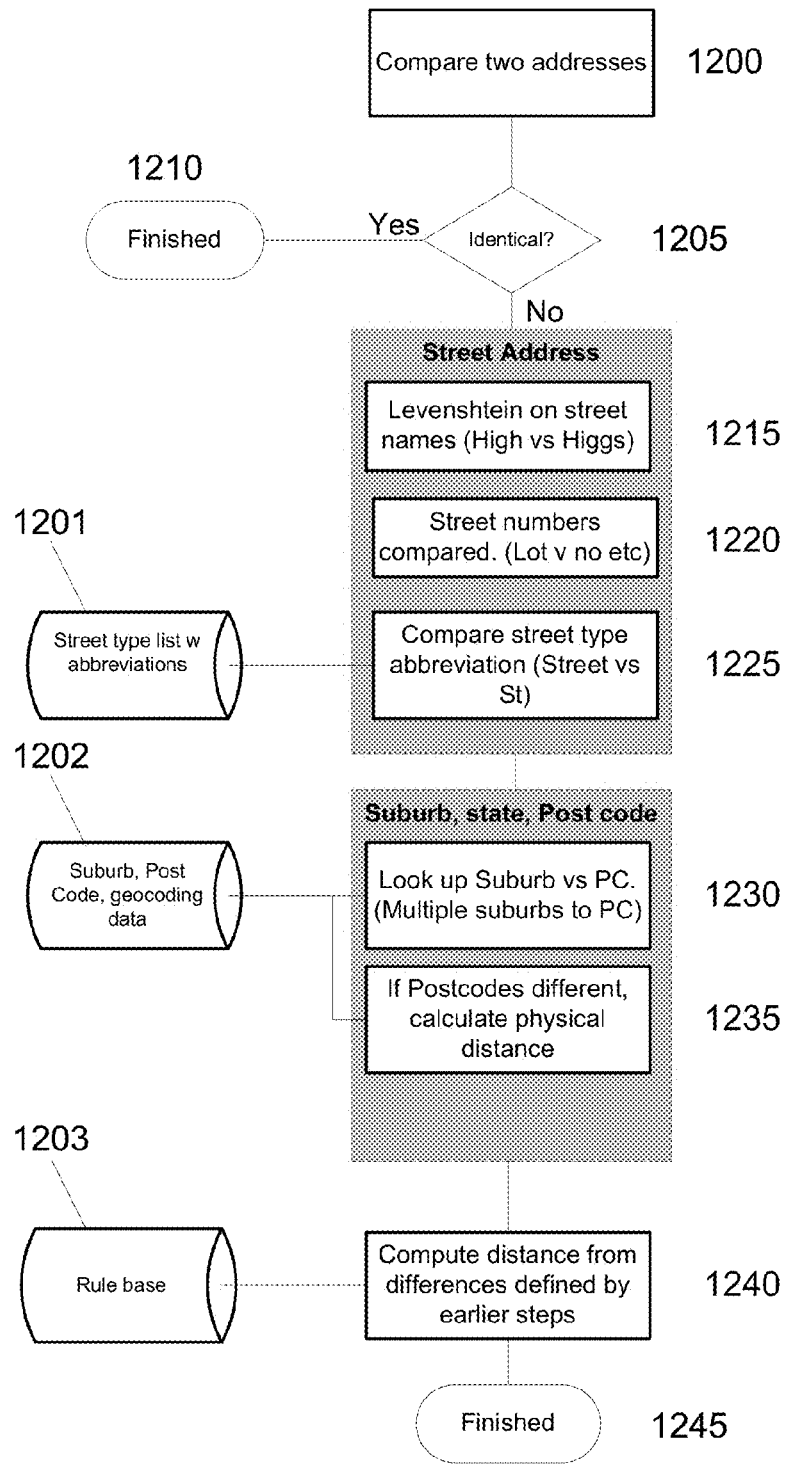
FIG. 12 is a flowchart of an example of a process for street address matching.

An example of the process for address matching will now be described with reference to FIG. 12.

In this example, at step 1200 the processing system 210 compares two addresses and determines if these are identical. If the addresses are determined to be identical at step 1205, the process moves on to step 1210 and finishes. However, if the addresses are not identical, then the processing system 210 moves on to assess the street address against a database of street type listings and abbreviations.

To achieve this, the processing system 210 performs Levenshtein matching on street names at step 1215, compares street numbers at step 1220, and then compares street types at step 1225, using a street type database including a list of common abbreviations for different street types.

Following this, the process moves on to assess the suburb, state and postcode against a suburb postcode geocoding data database 1202, which specifies the postcodes for different suburbs. This is achieved by examining the suburb and postcode and if these relate to a different geographical locations, calculating a physical difference between these at steps 1230 and 1235.

Finally, a distance is computed at step 1240 using a rule base 1203 which allows the processing system 210 to ascertain a difference between the street addresses. Assuming the difference falls below a threshold, then the search query address is determined to match the existing address. Once this has been completed, the process finishes at step 1245.

Accordingly, the above examples describe techniques for performing entity searching using a graphical network representation, and automated matching processes to identify related entities.

In one example, the process is provided integrated into existing Data Search and Reporting applications. Integration may be part of a Commercial Public Cloud solution or as part of a Corporate (Internal) Private Cloud application. This allows the process to be embedded into existing data solutions to provide a visualisation capability that supplements data search functions and report processes. Visualisation brings a new and powerful paradigm to searching and the exploration of data, and is applicable to a wide range of applications.

As well as visualisation, the process can provide further benefits including Document and Report management and integration to external Workflow, Document Collaboration and Case Management systems.

In one example, the process is implemented as part of a multi-tiered architecture that is best described in the functions of:

Data Access Retrieving the data and reports.
Business Intelligence Evaluating and processing data according to business requirements.
Visualisation Presenting a picture, or relationship map of the data to the user for evaluation and processing.

Operating as loosely coupled, independent modules, this allows the process to easily adapt to new data searches, apply product specific business rules and present the data into a variety of visual presentation technologies.

In one example, data products are configured and managed in the separate tiers of the application as follows:

Data Integration tier—Data and reports can be accessed for the solution through client adaptors. These are configured to access data via Web Services, or directly from database tables, stored procedures or from structured or non-structured system data files.

Business Intelligence tier—The solution behaviour is determined from Business Rules. These include how new data is matched and merged into the picture (or relationship map), and what alerts and notification behaviour to be triggered from content received in the search results.

Visualisation tier—the visualisation components include icons, links and visualisation alert symbols that are defined for each product. In many cases the process will have icon sets for the types of entities required in visualisation, but additional or customized components can be configured for each Data Search Product.

In one example, the processes can be easily integrated into existing search application environments. allowing enhanced data searching and reporting through the addition of a visualisation, in the form of a network representation, representing the search results. The addition of visualisation provides a powerful environment for users to uncover key data that otherwise may not be found, and to quickly understand important relationships within the data.

The system can also be used to provide an environment to manage data and reports that result from searches, along with the network representation image. Reports and documents purchased by the user can be viewed at any time; downloaded to the user's file system; shared online with other nominated users or exported to external workflow or case management systems.

Integration enables user authentication and data contexts to be passed between the originating application and the processing system 210, resulting in a seamless experience between the existing search forms and the new visualisation workspace.

In one example, the process is designed to be launched from within search applications and to engage with the visualisation process at different stages. Search criteria and the users product search preferences can be passed to initiate the process, and have the visualisation result displayed immediately in the workspace.

The integration parameters can include user authentication tokens, which are used by the process for proxy access to underlying data services or database access calls.

In the specific example, the process is invoked in a separate window from code attached to a web part (button) on the originating Search Application form. The button click assigns context values from the users session to a function, in this case passing the following values to the process (note these are sample only and do not limit the integration methods or integration options):

authToken—a token representing a unique login context for the user passed to the processing system 210 to enable authorized calls to the Information Provider's Web Services (the data source 205). In this case, a mandatory request parameter to the web service calls is a valid authentication token.

userID—a unique reference for the user. The processing system 210 establishes a account for the user within the an operations database. This enables the processing system 210 to uniquely identify all Workspace items including purchased documents and visualisation that eventuate from the session activities.

userName—a name to enable personalization of the experience.

accountCode—a string that identifies a grouping for the user. The processing system 210 can use this grouping for authorizing product access, and to report buying activities at a group or customer account level.

action—The process can be initiated in a number of different locations. Depending on the Search type that the user requires, the processing system 210 starts at a position that initiates a specific type of search, or automatically complete search steps.

matterRef—a client reference to tag the purchase or search activities with a client or project. The processing system stamps all transactions in the session with this value for later reference or reporting.

In one example, the system presents a seamless transition between the Search application and the Visualisation Workspace by sharing a user's authentication context. Typically a user will be authenticated in an originating application and then depending on the underlying security model, the processing system 210 can be passed a token representing the authenticated session that is used in follow on calls to web services or database access.

In the same way, user group information for restricting authorization to certain data product sets can be managed. For this to occur, the authorizations data would need to be accessible as a look up service to the processing system 210, or loaded into the database 211.

The processing system 210 can also be adapted to maintain an anonymous identification for the user to allow for personalization of the visualisation experience and for identification of all data searches. Through this identification the user is able to view and manage previous searches and share Workspace collateral. This includes maintaining all searches for later review, modification or collaboration with colleagues and clients, and the ability to attach notes or upload documents for specific cases.

The process can also be integrated with existing Workflow and Case Management Processes. In this case, the data, reports and network representation can serve as an integral part for many work profiles and tasks. To achieve this, the processing system 210 can provide for easy exportation of the images, reports and documents for collaboration and inclusion into external workflow or case management processes. The export process typically packages the Workspace content, or selected items, into a transportable file format (e.g. compressed archive file) suitable for web browsers and Internet transmission.

The workflow and end point for the export can be customized, such as passing to orchestration services offered by the Workflow, Collaboration or Case Management systems.

The system typically implements a data integration tier provides the integration to perform the data request and response activities from within the visualisation solution. To achieve this the processing system 210 utilizes "Client Adaptor" components that are configured for each data source and are responsible for translating the data received from the request and applying it to the visualisation model. This allows the processing system 210 to consume various types of data from local or remote hosting via Web Services, or relational database access and file system locations.

The Client Adaptors are a key component for integrating with data sources. The Client Adaptors can be configured to access any format of data storage; the common formats include Web Services over HTTPS, or directly from SQL relational databases using queries, stored procedures or object relational mapping (ORM) technologies.

In the case of direct database access, the services may be hosted in close proximity to the databases, and typically within an organisation's existing network environment. For remote access, Encompass Client Adaptors are configured to consume Web Service methods over a secure Internet protocol.

The Web Service definition files (WSDL) describe the methods and the request and response parameters, from which the client adaptor translates into the visualisation model framework. In the case of direct database access, the database schema, view models or stored procedure APIs (Application Programming Interfaces) can be used to configure the client adaptor.

In one example, the processing system implements a Business Intelligence Tier that provides the capability to define the behaviour for smart searching and the corresponding visualisation. This behaviour includes alerts, special visualisation cues that are triggered into the visualisation from events in the data, and notifications, information advised to the user from these events.

The process also supports the automatic rebuying of reports or updating of searches based on certain criteria occurring. These might include the expiry of a report's shelf life, or triggered from a timed event, such as a number days before property settlement.

Several search tasks can be orchestrated together to perform specific job profiles. These are defined using business rules definition.

In one example, the processing system 210 manages the business rules and intelligence events within a loosely coupled services layer. Implementing new Product Data Sets and the associated Visualisation models are made easier by abstracting the behaviour into external definitions Meta data and Business Rule sets.

External business rules can further alleviate the need for modification of software code and product deployments.

The system can also provide a Rules Framework that allows the externalization of the business logic or behaviour rules. This allows easy implementation of new Data Product sets as well as the automation of tasks to occur within the visualisation exercise. The rules engine allows the business policies to be defined and automated, which can in turn provide the following benefits:

Increasing the accuracy of processing the search results.
Ensure compliance with and consistency of data regulations.
Triggering action on critical events.
Allow decision-making rules to be accessible. Rules are easy to access and report on so you know how your processes are configured to behave.
Business users can modify rules frequently without the need of IT resources.
Rule definitions are reusable across Data Products.
Business Rules are seamlessly integrated into search and report buying processes.
Changes to business rules can be implemented immediately in running processes.
Rules can be used to control activity reporting, scheduling and exception handling.

In one example, the system includes a Visualisation Tier, which provides a Rich Web Application in which users search for data and see the results presented in the network representation. A user commences with a search for a company, person, property or document, and may be presented a list of matches to browse thru, and then to select items of interest, or when a single result is found, be directed straight to the visualisation.

The behaviour for the search input forms; browse lists and visualisation can be customized for each Data Product by integration to the Business Rules.

Once a network representation is generated, this can be used to perform further searching, as described above. In this regard the network representation provides an intuitive interface for exploring the content of the search results, viewing reports from a documents panel, and understanding the relationships via a range of visualisation layouts. It also provides a powerful way to perform follow on searches from within the picture by right clicking on an icon and selecting from the available report options from a menu.

The report options are dynamically presented based on the Data Product configuration and the User's authorizations.

The content displayed in the network representation is assigned to icons, links, alerts and other miscellaneous activities, such as attachments and notes.

The system provides a very granular approach for icons allowing detailed visual cues to represent sub categories of entities, for example Public and Private companies, different types of documents, variations on Person or Company statuses etc. Icons are assets within the framework and can be easily assigned to Data Products, with variation on any variable attribute for an entity.

The processing system 210 can also manage a range of metadata associated to searches along with copies of the reports on behalf of the user. This data is managed in databases stored on Secure Cloud Hosted servers. This allows reports and results to be stored in compliance with the statutory shelf life for reports and removes from the storage when expired.

The system can also manage additional data sets that augment the search solution. These can include data that may not be available through runtime services such as Security Access Authorizations data, Product Pricing details, or supplementary lookup reference data.

Accordingly, the above described examples provide techniques that enable searches for, and purchases of, information to be made utilizing the information held in the nodes of a network representation and incorporating the new information into the network representation. This results in the extension of the chart function from being only a visualization tool into an integral driver of the search and purchase processes.

Searching for matches can be performed directly from the network representation, with the processes automatically generating a query to extend the information appertaining to an entity that is represented as an icon on the network representation. The search values are selected from data held in association with the entity in the data structures associated with the network representation. The search is triggered by the user right clicking on the icon with a mouse and selecting a search source from one of a number of sources identified by the software as potentially containing further information about the entity The system allows for purchasing reports from the network representation by having a user select items for purchase directly as the result of making a search, for example using the network representation.

The process therefore allows users to draw together information about an entity, (a person, an organization, a location etc.) from disparate sources and presents all the relevant entities together with their interconnections in a visually appealing way in the form of a network representation. This process is typically underpinned by the source information from which the information is drawn. Particular areas of application include banking and finance and government agencies.

The user must have confidence that the information is as accurate and complete as far as the available source material allows. The source information is typically publically available, albeit for a fee from information provider and comes from disparate sources such as industry regulators, Land title offices, insolvency and trustee services, credit agencies etc. The source information is typically presented by the information provider as a report in a standard format, usually held internally in the provider's holdings as an XML record, and in report form as a PDF document.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A method of displaying information relating to one or more entities, the method including, in an electronic processing device:
   a) generating a network representation, the representation including:
      i) a number of nodes, each node being indicative of a corresponding entity; and,
      ii) a number of connections between nodes, the connections being indicative of relationships between the entities;
   b) causing the network representation to be displayed to a user;
   c) in response to user input commands, determining at least one user selected node corresponding to a user selected entity;
   d) determining at least one search to be performed in respect of the corresponding entity associated with the at least one user selected node by;
      i) determining an entity type of the at least one user selected entity;
      ii) displaying a list of a number of available searches relating to the at least one user selected entity in accordance with the entity type, wherein the list of a number of available searches is displayed as part of the network representation and wherein the list of a number of available searches includes a number of different databases that can be searched for information regarding the entity type of the user selected entity; and,
      iii) determining selection of at least one of the available searches in accordance with user input commands, allowing the user to select the search from the network representation, the selection including a selected database;
   e) performing the at least one search to thereby determine additional information regarding the entity by:
      i) determining search parameters required to generate a search query for searching the selected database;
      ii) causing required parameters to be displayed to the user;

iii) determining the required parameters in response to user input commands;
iv) generating a search query using the required parameter, the search query being formatted in appropriate way for analysis and interpretation by the selected database; and
v) providing the search query to the selected database to thereby determine additional information regarding the entity;

f) generating a summary a list including a list of potentially relevant entities matching the at least one user selected entity;

g) determining user selection of at least one potentially relevant entity;

h) displaying a prompt relating to a cost of the search allowing a user to confirm the search is to be performed;

i) in response to confirmation, causing the search to be performed;

j) receiving a report indicative of the search results;

k) parsing the report to determine any additional information regarding the at least one used selected entity; and l) updating the network representation to cause any additional information to be presented to the user.

2. A method according to claim 1, wherein the additional information includes details of entities related to the at least one user selected entity, and wherein the method includes generating a second network representation, the second network representation including:
   a) a number of nodes, each node being indicative of a corresponding entity and the entities include the at least one user selected entity and at least one related entity; and,
   b) a number of connections between the nodes, the connections being indicative of relationships between the entities.

3. A method according to claim 2, wherein the method includes generating the second network representation by modifying the network representation.

4. A method according to claim 3, wherein the method includes modifying the network representation by adding one or more nodes corresponding to at least one related entity.

5. A method according to claim 1, wherein the method includes determining the at least one user selected node by determining selection of a node in the network representation using a user input device.

6. A method according to claim 1, wherein the method includes generating a search query using at least one of:
   a) predefined rules; and,
   b) a predefined script.

7. A method according to claim 1, wherein the method includes:
   a) in response to user input commands, determining at least one manipulation of a network representation; and,
   b) generating a manipulated network representation in accordance with user input commands.

8. A method according to claim 1, wherein the method includes:
   a) in response to user input commands, determining a search to be performed;
   b) generating a search query in accordance with the determined search to be performed; the search query being applied to a repository to thereby determine details regarding:
      i) a number of entities; and,
      ii) relationships between the number of entities; and,
   c) using the details to generate the network representation.

9. A method according to claim 1, wherein the method includes:
   a) determining search results data indicative of additional information; and,
   b) analyzing the search results data to identify at least one entity.

10. A method according to claim 9, wherein the method includes identifying at least one entity by at least one of:
    a) pattern matching; and,
    b) fuzzy logic.

11. A method according to claim 9, wherein the method includes identifying at least one entity by at least one of:
    a) determining entity details from the search results data, the entity details including at least one of:
       i) an entity name;
       ii) an entity address; and,
       iii) date of birth;
    b) comparing the entity details to existing entity details for existing identified entities; and,
    c) determining if the entity is one of the existing entities based on the results of the comparison.

12. A method according to claim 11, wherein the method includes:
    a) modifying the entity details in accordance with at least one of:
       i) defined misspellings; and,
       ii) phonetic equivalents; and,
    b) comparing modified entity details to the existing entity details.

13. A method according to claim 11, wherein the method includes:
    a) determining a distance indicative of a difference between the entity details and existing entity details; and,
    b) determining the entity as an existing entity based on the difference.

14. A method according to claim 9, wherein the search results data is in the form of a mark-up data file and wherein the method includes:
    a) determining a document definition; and,
    b) determining entity details in the mark-up file using the document definition.

15. A method according to claim 1, wherein the method includes receiving the search results data via a communications network.

16. Apparatus for displaying information relating to one or more entities, the apparatus including, a processing system having an electronic processing device, a memory, an input and a display, wherein the electronic processing device:
    a) generates a network representation, the representation including:
       i) a number of nodes, each node being indicative of a corresponding entity; and,
       ii) a number of connections between nodes, the connections being indicative of relationships between the entities;
    b) causes the network representation to be displayed to a user using the display;
    c) in response to user input commands provided via the input, determines at least one user selected node;
    d) determines at least one search to be performed in respective of the corresponding entity associated with the at least one user selected node by;
       i) determining an entity type of the at least one user selected entity;
       ii) displaying a list of a number of available searches relating to the at least one user selected entity in accordance with the entity type, wherein the list of a number of available searches is displayed as part of the network representation and wherein the list of a number of available searches includes a number of different databases that can be searched for information regarding the entity type of the user selected entity; and, iii) determining selection of at least one of the available searches in accordance with user input commands, allowing the user to select the search from the network representation, the selection including a selected database;

e) performs the at least one search to thereby determine additional information regarding the entity by:

i) determining search parameters required to generate a search query for searching the selected database;

ii) causing required parameters to be displayed to the user; and, iii) determining the required parameters in response to user input commands;

iv) generating a search query using the required parameter, the search query being formatted in appropriate way for analysis and interpretation by the selected database; and v) applying the search query to the selected database to thereby determine additional information regarding the entity;

f) generates a summary a list including a list of potentially relevant entities matching the at least one user selected entity;

g) determines user selection of at least one potentially relevant entity;

h) displays a prompt relating to a cost of the search allowing a user to confirm the search is to be performed;

i) in response to confirmation, causes the search to be performed;

j) receives a report indicative of the search results;

k) parses the report to determine any additional information regarding the at least one used selected entity; and l) updates the network representation to cause any additional information to be presented to the user using the display.

* * * * *